US006899273B2

(12) United States Patent
Hussey et al.

(10) Patent No.: US 6,899,273 B2
(45) Date of Patent: May 31, 2005

(54) OPTICAL READER COMPRISING SOFT KEY INCLUDING PERMANENT GRAPHIC INDICIA

(75) Inventors: Robert M. Hussey, Camillus, NY (US); Timothy R. Fitch, Syracuse, NY (US); Lee Kinson, Auburn, NY (US); Joseph Walczyk, Syracuse, NY (US); Clayton Roberts, Tully, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 74 days.

(21) Appl. No.: 10/137,485

(22) Filed: May 2, 2002

(65) Prior Publication Data

US 2003/0006290 A1 Jan. 9, 2003

Related U.S. Application Data

(60) Provisional application No. 60/325,449, filed on Sep. 27, 2001, provisional application No. 60/323,422, filed on Sep. 19, 2001, and provisional application No. 60/288,176, filed on May 2, 2001.

(51) Int. Cl.$^7$ .................................................. G06K 7/10
(52) U.S. Cl. ............................ 235/462.48; 235/462.43; 235/462.45
(58) Field of Search ................... 235/462.48, 472.01, 235/383, 385, 472.03

(56) References Cited

U.S. PATENT DOCUMENTS

| 4,132,902 A | 1/1979 | Everest |
| 4,143,417 A | 3/1979 | Wald et al. |
| 4,455,523 A | 6/1984 | Koenck |
| 4,553,081 A | 11/1985 | Koenck |
| 4,575,623 A | 3/1986 | Conomi et al. |
| 4,679,154 A | 7/1987 | Blanford |

(Continued)

FOREIGN PATENT DOCUMENTS

| EP | 1 202 104 | 8/2000 |
| WO | WO 00/04487 | 1/2000 |
| WO | WO 00/11447 | 3/2000 |
| WO | WO 00/16240 | 3/2000 |
| WO | WO 00/16248 | 3/2000 |
| WO | WO 00/33239 | 6/2000 |
| WO | WO 00/39742 | 7/2000 |
| WO | WO 00/46626 | 8/2000 |
| WO | WO 00/46735 | 8/2000 |
| WO | WO 00/55574 | 9/2000 |
| WO | WO 00/57348 | 9/2000 |
| WO | WO 00/60526 | 10/2000 |
| WO | WO 00/65400 | 11/2000 |
| WO | WO 00/69324 | 11/2000 |
| WO | WO 00/70535 | 11/2000 |
| WO | WO 00/75856 | 12/2000 |
| WO | WO 00/75857 | 12/2000 |
| WO | WO 00/78205 | 12/2000 |
| WO | WO 00/79323 | 12/2000 |
| WO | WO 00/79790 | 12/2000 |
| WO | WO 01/11413 | 2/2001 |
| WO | WO 01/13158 | 2/2001 |
| WO | WO 01/24101 | 4/2001 |
| WO | WO 01/24686 | 4/2001 |
| WO | WO 01/26035 | 4/2001 |
| WO | WO 01/29576 | 4/2001 |

*Primary Examiner*—Karl D. Frech
*Assistant Examiner*—Ahshik Kim
(74) *Attorney, Agent, or Firm*—Wall Marjama & Bilinski LLP

(57) ABSTRACT

An optical reader with at least two variable definition soft keys positioned adjacent the display and externally labeled with permanent down and up arrow indicia. Variable definition soft keys are highly versatile an allow the user to change or alter the function of the soft keys based on a user program. Soft keys positioned adjacent the display and labeled with down and up arrows graphically reinforce a wide range of text and graphic combinations shown on the display.

45 Claims, 29 Drawing Sheets

U.S. PATENT DOCUMENTS

| | | |
|---|---|---|
| 4,758,717 A | 7/1988 | Shepard et al. |
| 4,772,769 A | 9/1988 | Shumate |
| 4,825,057 A | 4/1989 | Swartz et al. |
| 4,910,794 A | 3/1990 | Mahany |
| 4,940,974 A | 7/1990 | Sojka |
| 4,947,028 A | 8/1990 | Gorog |
| 5,043,563 A | 8/1991 | Chi et al. |
| 5,107,100 A | 4/1992 | Shepard et al. |
| 5,107,765 A | 4/1992 | Schippers |
| 5,142,669 A | 8/1992 | Inoue et al. |
| 5,157,687 A | 10/1992 | Tymes |
| 5,229,590 A | 7/1993 | Harden et al. |
| 5,237,162 A | 8/1993 | Harden et al. |
| 5,260,554 A | 11/1993 | Grodevant |
| 5,262,628 A | 11/1993 | Shepard et al. |
| 5,268,823 A | 12/1993 | Yergenson |
| 5,322,991 A | 6/1994 | Hanson |
| 5,331,136 A | 7/1994 | Koenck et al. |
| 5,347,622 A | 9/1994 | Takemoto et al. |
| 5,354,977 A | 10/1994 | Roustaei |
| 5,396,055 A | 3/1995 | Shepard et al. |
| 5,397,867 A | 3/1995 | Demeo |
| 5,459,554 A | 10/1995 | Shiraishi |
| 5,471,042 A | 11/1995 | Kirkeby et al. |
| 5,483,577 A | 1/1996 | Gulick |
| 5,491,507 A | 2/1996 | Umezawa |
| 5,493,106 A | 2/1996 | Hunter |
| 5,495,566 A | 2/1996 | Kwatinetz |
| 5,496,992 A * | 3/1996 | Madan et al. .......... 235/472.02 |
| 5,515,303 A | 5/1996 | Cargin, Jr. et al. |
| 5,530,619 A | 6/1996 | Koenck et al. |
| 5,532,469 A | 7/1996 | Shepard et al. |
| 5,539,193 A | 7/1996 | Gibbs et al. |
| 5,539,194 A | 7/1996 | Miller et al. |
| 5,541,858 A * | 7/1996 | Warner ....................... 702/165 |
| 5,543,610 A | 8/1996 | Bard et al. |
| 5,559,512 A | 9/1996 | Jasinski et al. |
| 5,565,671 A | 10/1996 | Kirkeby et al. |
| 5,600,121 A | 2/1997 | Kahn et al. |
| 5,604,516 A | 2/1997 | Herrod et al. |
| 5,644,601 A | 7/1997 | Kawaguchi |
| 5,654,534 A | 8/1997 | Coleman |
| 5,661,658 A | 8/1997 | Putt et al. |
| 5,670,770 A | 9/1997 | Miyata et al. |
| 5,671,267 A | 9/1997 | August et al. |
| 5,675,139 A | 10/1997 | Fama |
| 5,706,214 A | 1/1998 | Putt et al. |
| 5,711,588 A | 1/1998 | Rudisill |
| 5,737,392 A | 4/1998 | Cheng et al. |
| 5,740,035 A * | 4/1998 | Cohen et al. ................. 705/10 |
| 5,747,756 A | 5/1998 | Boedecker |
| 5,747,786 A | 5/1998 | Cargin, Jr. et al. |
| 5,751,793 A | 5/1998 | Davies et al. |
| 5,762,512 A | 6/1998 | Trant et al. |
| 5,765,100 A | 6/1998 | Martino |
| 5,796,359 A | 8/1998 | Beard |
| 5,801,371 A | 9/1998 | Kahn et al. |
| 5,804,894 A | 9/1998 | Leeson et al. |
| 5,815,811 A | 9/1998 | Pinard et al. |
| 5,818,553 A | 10/1998 | Koenck et al. |
| 5,832,337 A | 11/1998 | Isemura |
| 5,850,078 A | 12/1998 | Giordano et al. |
| 5,859,970 A | 1/1999 | Pleso |
| 5,873,070 A | 2/1999 | Bunte et al. |
| 5,889,818 A | 3/1999 | Spiess |
| 5,892,813 A | 4/1999 | Morin et al. |
| 5,898,290 A | 4/1999 | Beard et al. |
| 5,910,653 A | 6/1999 | Campo |
| 5,920,684 A * | 7/1999 | Hastings et al. ........... 358/1.13 |
| 5,936,220 A * | 8/1999 | Hoshino et al. ............ 235/380 |
| 5,945,660 A | 8/1999 | Nakasuji et al. |
| 5,946,617 A | 8/1999 | Portaro et al. |
| 5,956,655 A | 9/1999 | Suzuki et al. |
| 5,959,282 A | 9/1999 | Tabuchi |
| 5,977,954 A | 11/1999 | Arimoto et al. |
| 5,979,764 A | 11/1999 | Swyst et al. |
| 5,979,770 A * | 11/1999 | Schlieffers et al. ..... 235/472.01 |
| 5,995,019 A | 11/1999 | Chieu et al. |
| 6,002,390 A | 12/1999 | Masui |
| 6,002,946 A | 12/1999 | Reber et al. |
| 6,011,549 A | 1/2000 | Shoji et al. |
| 6,024,284 A | 2/2000 | Schmid et al. |
| 6,032,053 A | 2/2000 | Schroeder et al. |
| 6,037,919 A | 3/2000 | Hanson |
| 6,058,304 A | 5/2000 | Callaghan et al. |
| 6,065,679 A | 5/2000 | Levie et al. |
| 6,094,029 A | 7/2000 | Reynolds et al. |
| 6,097,964 A | 8/2000 | Nuovo et al. |
| 6,122,530 A | 9/2000 | Overy et al. |
| 6,128,549 A | 10/2000 | Swartz et al. |
| 6,149,062 A | 11/2000 | Danielson et al. |
| 6,158,662 A | 12/2000 | Kahn et al. |
| 6,177,926 B1 | 1/2001 | Kunert |
| 6,193,161 B1 | 2/2001 | Sojka et al. |
| 6,212,175 B1 | 4/2001 | Harsch |
| 6,215,474 B1 | 4/2001 | Shah |
| 6,223,058 B1 | 4/2001 | Sudo et al. |
| 6,234,394 B1 | 5/2001 | Kahn et al. |
| 6,241,456 B1 | 6/2001 | Kato et al. |
| 6,293,462 B1 * | 9/2001 | Gangi ........................ 235/380 |
| 6,315,195 B1 * | 11/2001 | Ramachandran ............ 235/380 |
| 6,680,802 B1 | 1/2004 | Ichikawa et al. |
| 6,748,124 B1 | 6/2004 | Nishiyama |
| 2003/0001018 A1 | 1/2003 | Hussey et al. |
| 2003/0206150 A1 | 11/2003 | Hussey et al. |

* cited by examiner

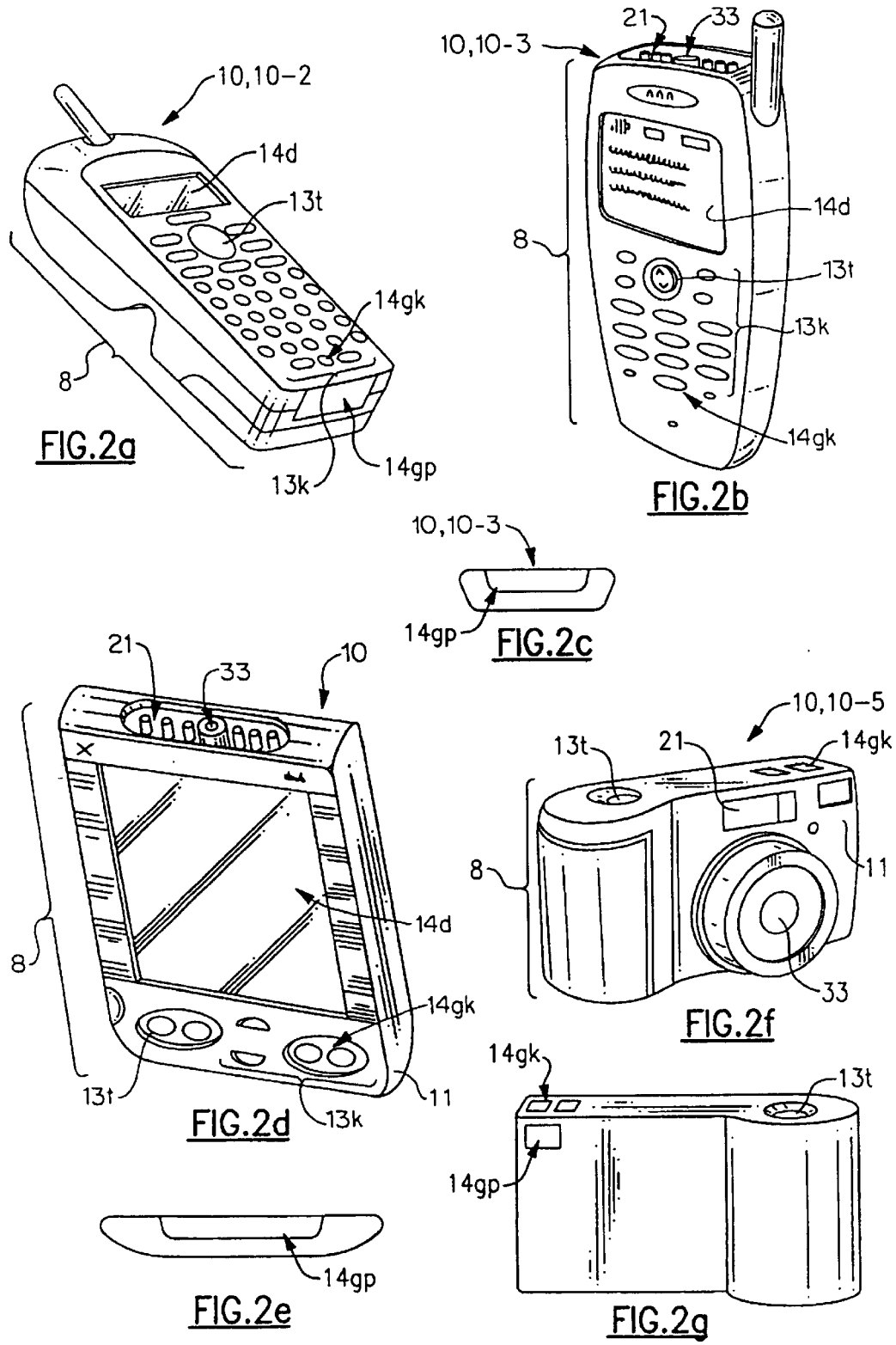

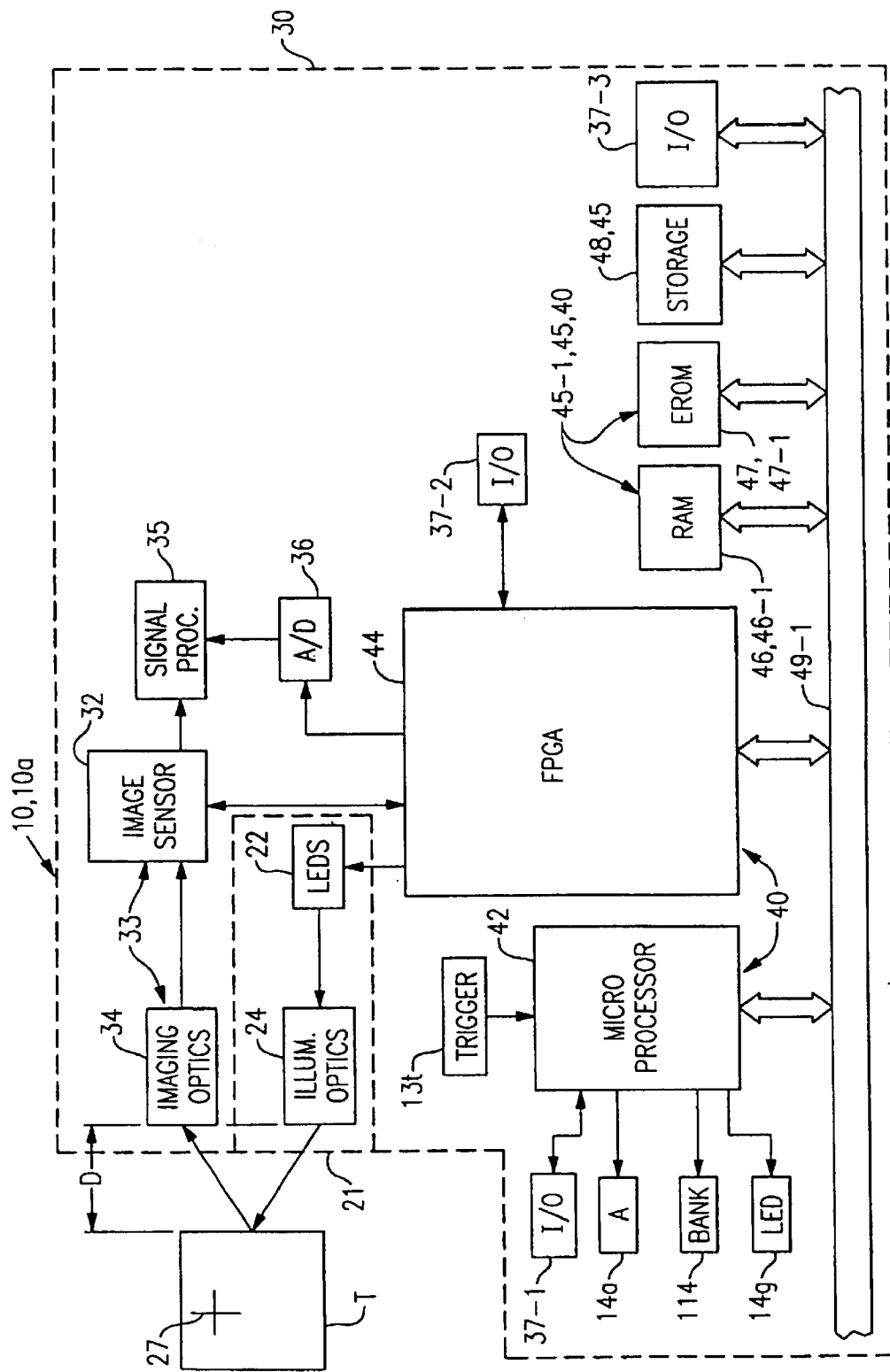

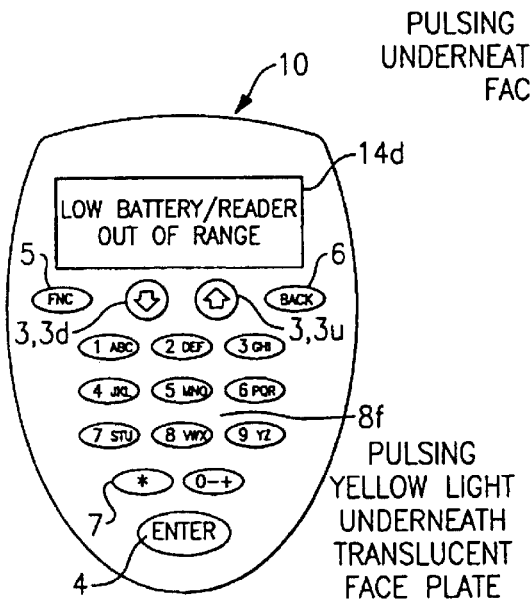
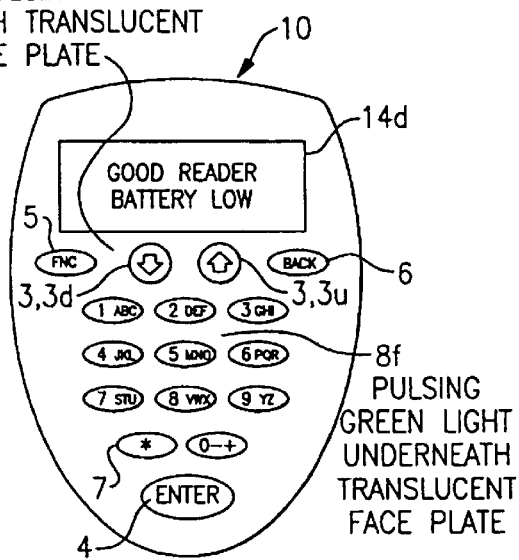
FIG.10e
FIG.10f
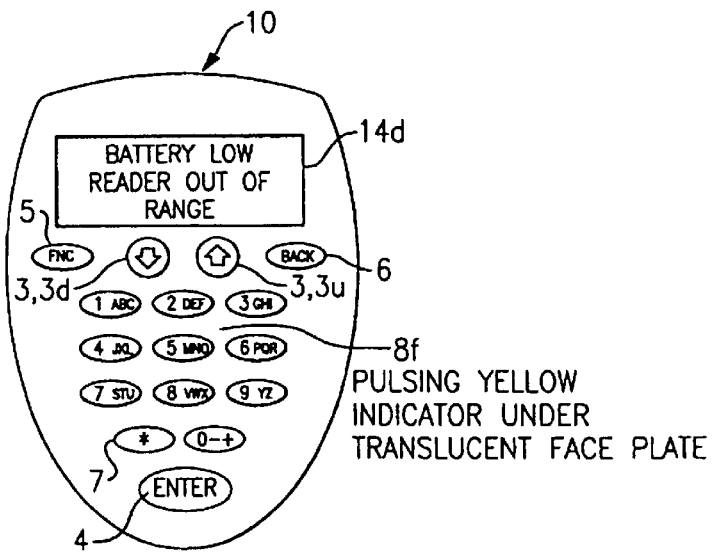
FIG.10g

OPTICAL READER COMPRISING SOFT KEY INCLUDING PERMANENT GRAPHIC INDICIA

CROSS-REFERENCE

This application claims the priorities of U.S. Provisional Application Serial No. 60/288,176, filed May 2, 2001, entitled "Optical Reader Comprising Keyboard," Provisional Application Serial No. 60/323,422, filed Sep. 19, 2001, entitled "Optical Reader Comprising Good Read Indicator," and Provisional Application Serial No. 60/325,449, filed Sep. 27, 2001, entitled "Optical Reader Comprising Soft Key Including Permanent Graphic Indicia." Each of the above-referenced Provisional Applications (Application Serial No. 60/288,176, Application Serial No. 60/323,422, and Application Serial No. 60/325,449) is hereby expressly incorporated by reference.

BACKGROUND OF THE INVENTION

Keyboard equipped hand held optical readers have emerged as an important industrial and commercial scanning product that offers flexibility and versatility. While the shape of a keyboard equipped hand held optical reader may be influenced by the keyboard and display, a reader's shape is primarily determined by scanning ergonomics. Scanning ergonomic concerns limit the area available for a keyboard, display, and good read status indicator.

Blank soft keys (soft keys without indicia formed thereon) are well known and widespread in reader technology and have been available for a number of years as disclosed in U.S. Pat. No. 4,310,839. However, operators using readers equipped with blank soft keys have encountered difficulty in comprehending the present function of such blank soft keys.

There is a need to improve an operator's ability to comprehend the present function of a soft key incorporated in a data collection device.

SUMMARY OF THE INVENTION

It is an object of the present invention to provide an optical reader with at least two variable definition soft keys positioned adjacent the display and externally labeled with permanent down and up arrow indicia. Variable definition soft keys are highly versatile and allow the user to change or alter the function of the soft keys based on a user program. Soft keys positioned adjacent the display and labeled with down and up arrows graphically reinforce a wide range of text and graphic combinations shown on the display.

In one aspect of the invention, the words "down" and "up" respectively, may be displayed adjacently relative to the down and up arrows on the display.

In another aspect of the invention the words "no" and "yes" may be displayed on a display adjacently relative to the down and up arrows.

In another aspect the invention the words "decrease" and "increase" may be displayed on a display adjacently relative to the down and up arrows display.

Another aspect of the invention the words "disagree" and "agree" may be displayed on a display adjacently relative to the down and up arrows display.

Another aspect of the invention the words "cancel" and "accept" respectively may be displayed on a display adjacently relative to the down and up arrows display.

In another aspect of the invention the words "reverse" and "forward" may be displayed on a display adjacently relative to the down and up arrows display.

In another aspect of the invention, two soft keys adjacent to the display and externally labeled with down and up arrow indicia may be used to or change various parameters represented by graphical or alphanumeric information shown on the display.

In another aspect of the invention the two soft keys adjacent the display may be externally labeled with indicia other than arrows such as a minus sign ("−") in combination with a plus sign ("+") indicia.

Other details, objects, and benefits of the present invention will become apparent from the detailed description of the preferred embodiments.

BRIEF DESCRIPTION OF THE DRAWINGS

Other objects and advantages of the present invention will be apparent from the following detailed description with reference to the accompanying drawings wherein:

FIG. 1b is a side elevation view of the optical reader shown in FIG. 1a;

FIG. 1c is a functional schematic diagram of the keyboard arrangement in the reader of FIG. 2c;

FIG. 1d is a rear view of the reader shown in FIG. 1a;

FIGS. 2a–2g illustrate alternative form factors for the reader shown in FIG. 1a;

FIGS. 3a–3e are block diagrams illustrating various hardware configurations for an optical reader;

FIG. 4a is an internal perspective view of the reader of FIG. 1a illustrating a status indicating panel according to the invention;

FIGS. 10a–10g are a series of reader keyboard schematic diagrams illustrating examples wherein indicator lights indicating various conditions are positioned within said reader head underneath a translucent face plate;

DETAILED DESCRIPTION OF PREFERRED EMBODIMENT

Figures 1A, 1E:
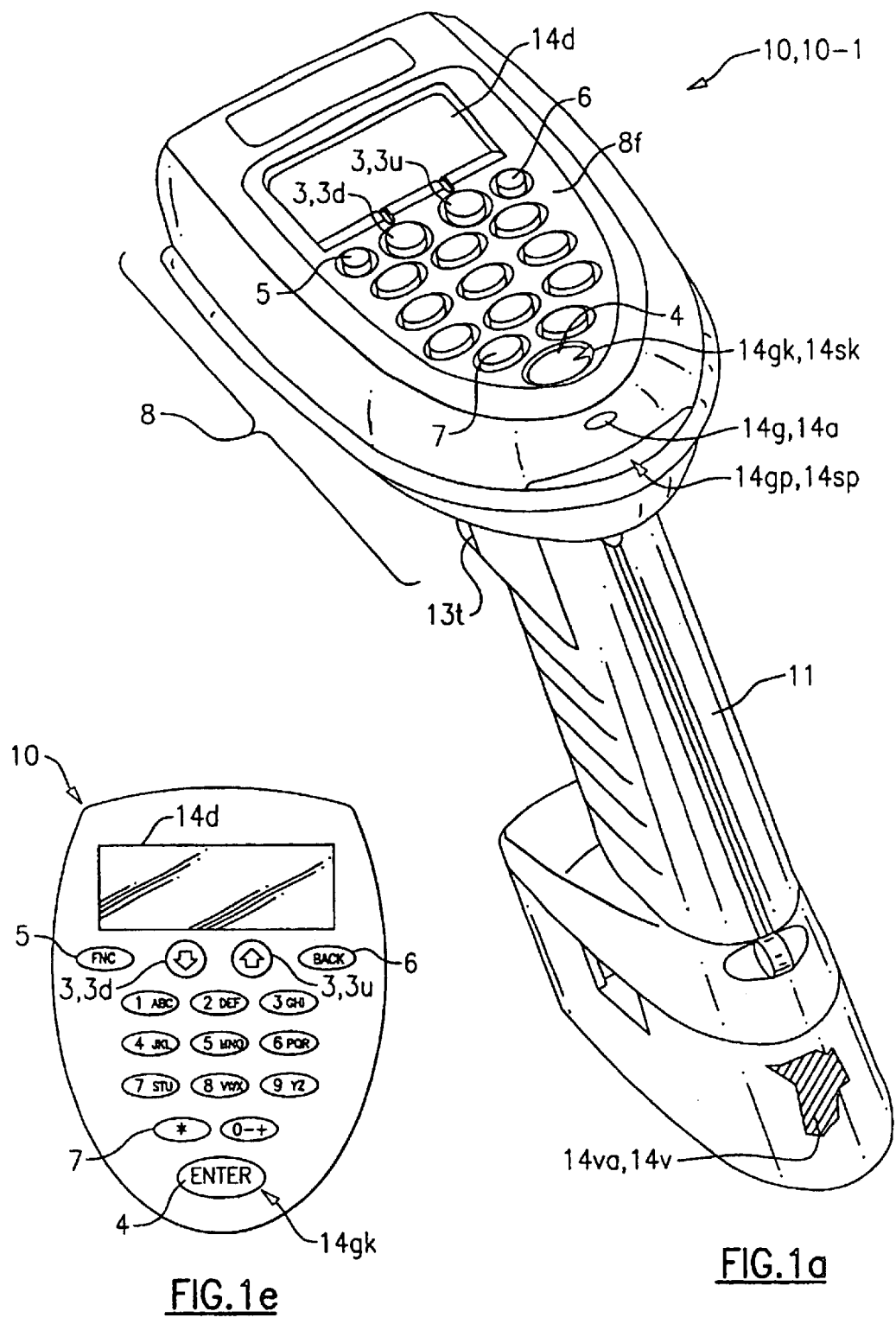
FIG. 1a is a perspective view showing a profile of an optical reader according to the present invention.
FIG. 1e is a top view of a reader according to the invention.
Figures 1B, 1C:
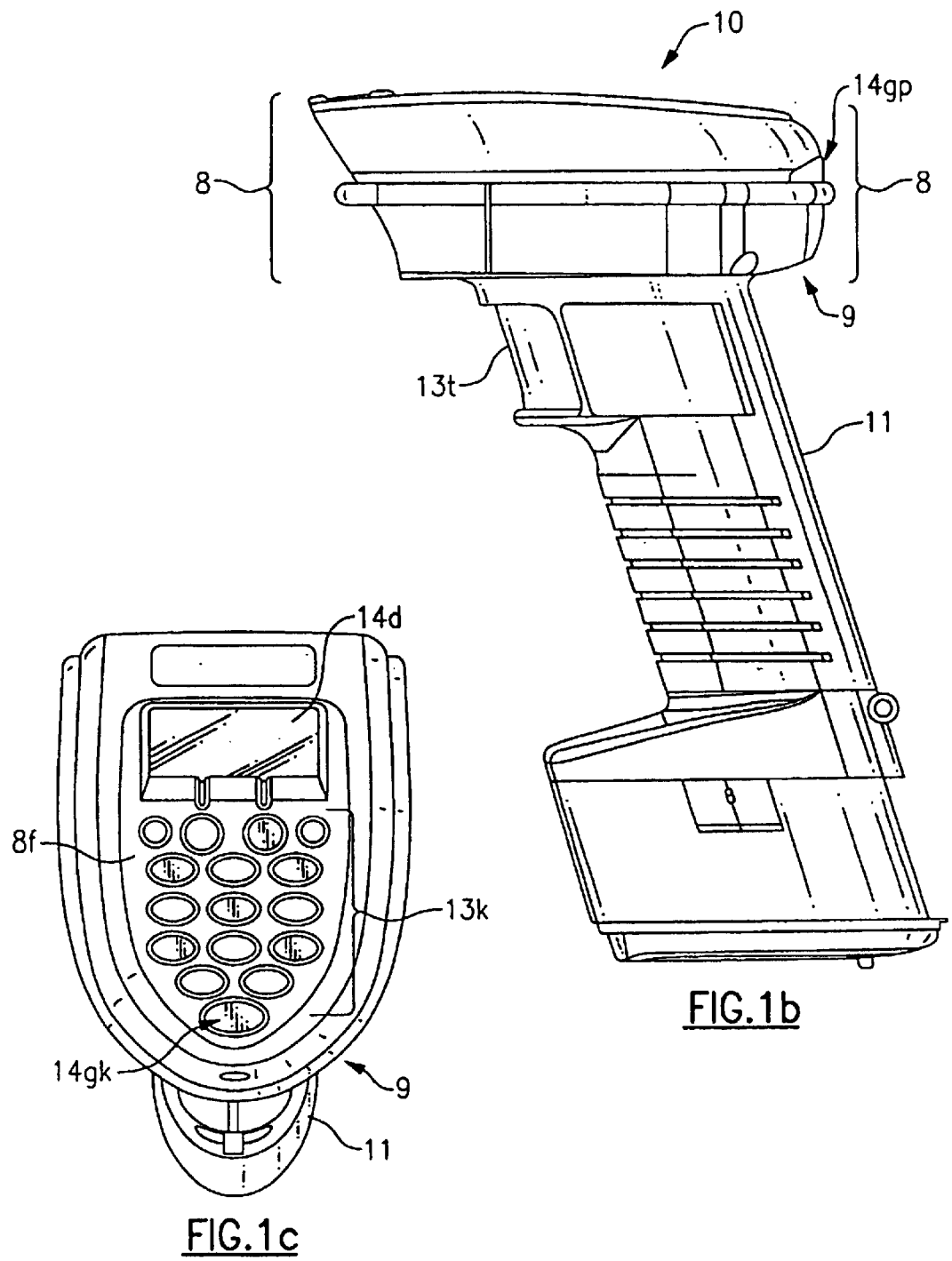

Referring now to FIGS. 1a–1e there are shown views of an exemplary optical reader according to the present invention. The reader 10 consists of a housing 11, reader head 8, reader head face plate 8f, display 14d, display backlight 14b, good read indicator 14g, trigger 13t, and keyboard 13k. Reader 10 in the embodiment shown in FIGS. 1a–1e also includes an enlarged good read panel 14GP positioned toward a rear of head 8. Reader 10 further incorporates a good read indicator 14GK in association with key 4 as will be explained more fully herein below.

The keyboard layout is similar to a telephone keyboard in which the alphanumeric keys include but are not limited to the numbers zero through nine, punctuation characters, an asterisk symbol, and two "soft" or variable definition keys, 3 labeled with down and up arrows. The keyboard also includes an ENTER key 4, a FUNCTION (FNC) key 5, a wild ASTERISK key 7, and a BACKSPACE (BACK) key 6.

The keys may be arranged in any number of ways on the keyboard, but will generally adhere to a pattern in which the ENTER key 4 will be positioned at the bottom, the BACK key 6 will be located in the upper right, the FNC key 5 will be located in the upper left, and the wild card ASTERISK key 7 will be located to the left of the zero. The two soft keys 3 will be positioned adjacent to the upper or lower border of the display 14d.

The size and spacing of the keys will be chosen to minimize accidental activation since it may be necessary to operate the keyboard in a variety of environments while wearing work gloves. Recessed keys and a rounded contour of the reader head surface can help to avoid accidental key presses. The rounded head slightly raises the center keys from their neighbors making inadvertent activation less likely.

Convex key surfaces can also help reduce accidental key presses since the center of each key will be the highest point on the key. If a user aims for the center of a key then his finger will be less likely to hit the edge of the neighboring key because it will be physically lower than the center of the intended key. A tactile and audio response may be provided to indicate that a key press has been successfully accepted. The mechanical force required to access each key will be about 120 g with a stroke of 1 mm.

The two soft keys 3 positioned adjacent to the display 14d have their meaning indicated by text or graphical icons shown on the display 14d. The soft keys 3 will generally be labeled with down and up arrows in accordance with their most typical use, but may have alternative delineations as will be explained herein.

In the example of FIG. 1e soft key 3d comprises a "down" arrow marking and "up" soft key 3u comprises an "up" arrow marking. A control circuit 40, explained in detail with reference to FIGS. 3a–3e, configured by an operating program will have the ability to change the interpretation of these keys. The current definition or response for these keys will depend on what data is shown in the adjacent display 14d.

Figure 5A:
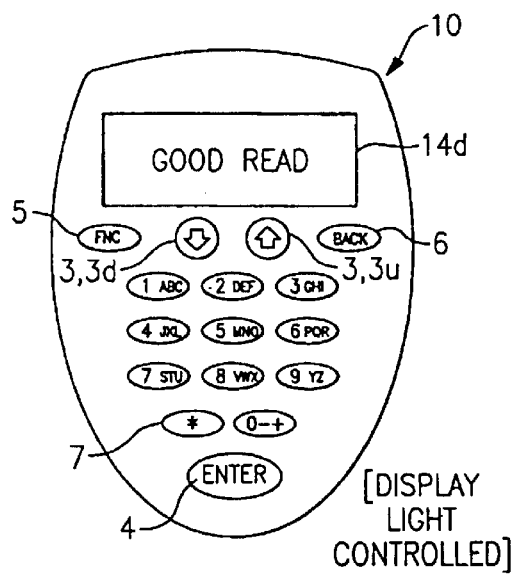
FIGS. 5a–5c are a series of reader keyboard schematic diagrams illustrating examples of using the display backlight as a good read indicator.
Figure 5B:
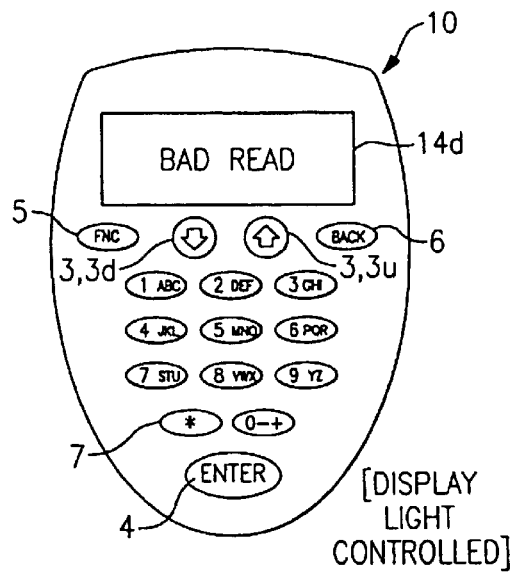
Figure 5C:
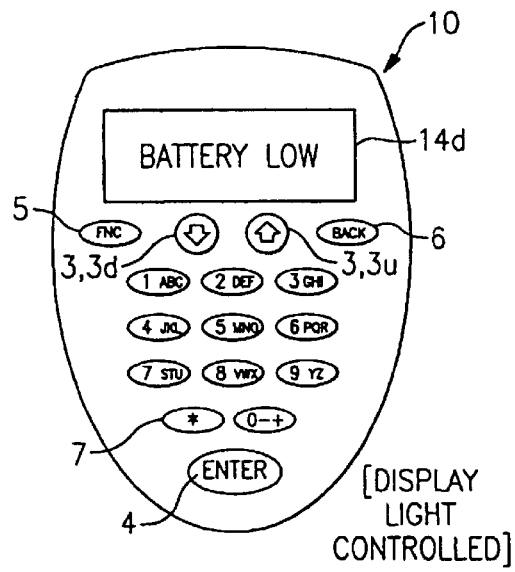
Figure 11A:
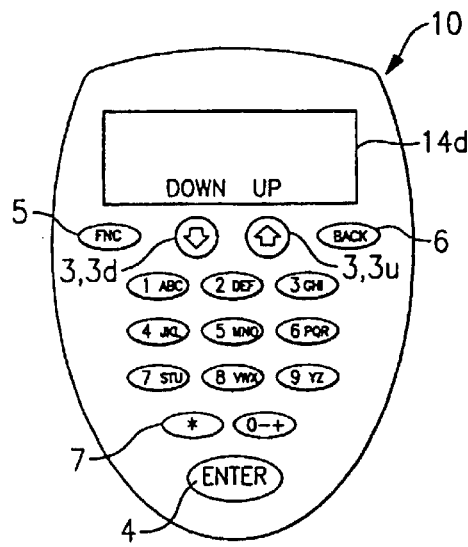
FIGS. 11a–11g are a series of reader keyboard schematic diagrams illustrating a function of a soft key of the invention.
Figure 11B:
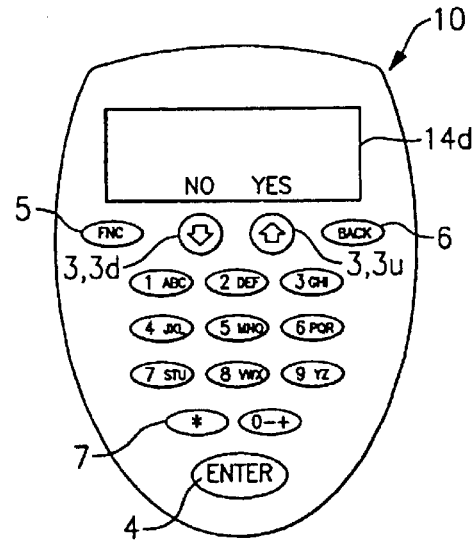
Figure 11C:
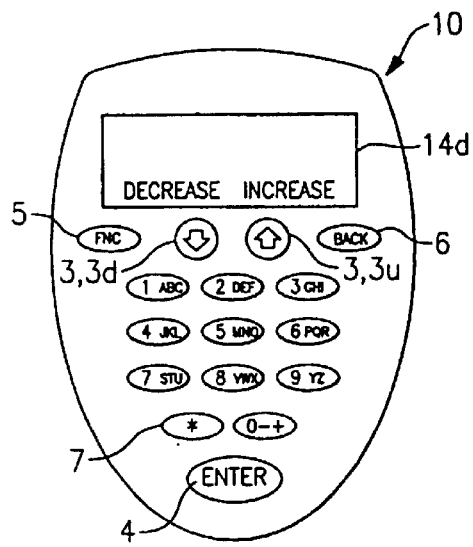
Figure 11D:
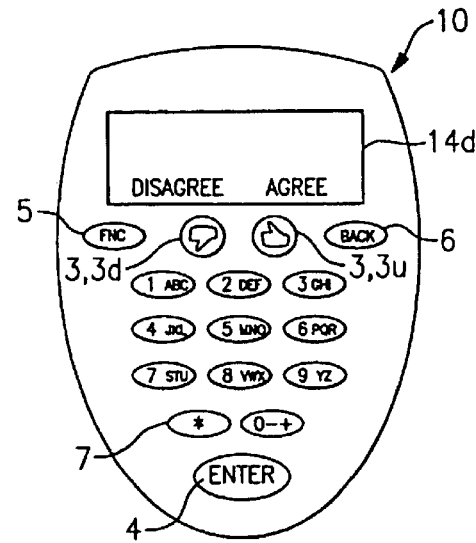
Figure 11E:
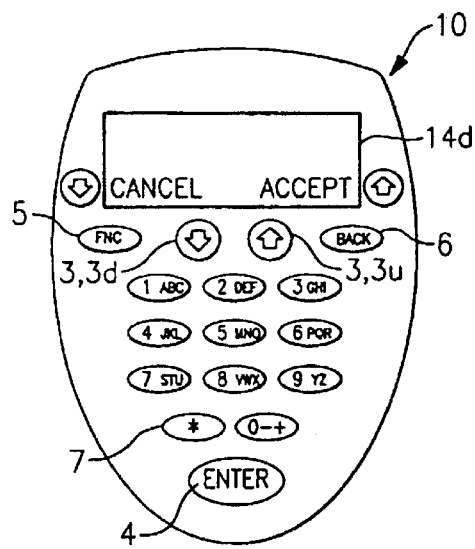
Figure 11F:
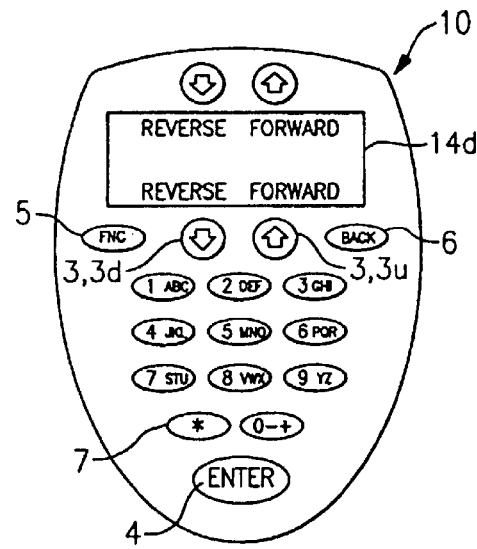
Figure 11G:
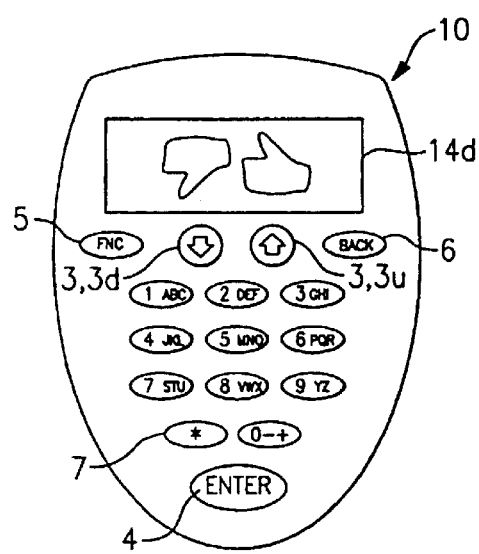

For example, in one operating mode the display 14d might show the words "DOWN" and "UP" above soft keys 3d and 3u, respectively, as shown in FIG. 11a. In another mode control circuit 40 may change the words above these same keys to "NO" and "YES" as shown in FIG. 5b. In another mode of operation, the words displayed on the display 14d above the down arrow soft key 3d and up arrow soft key 3u are "DECREASE" and "INCREASE" respectively as shown in FIG. 5c. It is seen in the particular example of FIG. 11d, down arrow 3d is provided by a "Thumbs down" indicia and up arrow 3u is provide by a "Thumbs up" indicia. In a still further mode, control circuit 40 may cause display 14d to display the word combination of the words "DISAGREE" above the down arrow soft key 3d and the word "AGREE" above the up arrow soft key 3u as shown in FIG. 11d. In another operating mode, control circuit 40 may cause display 14d to display the word combination "CANCEL" above the down arrow soft key 3d and the word "ACCEPT" above the up arrow soft key 3u as seen in FIG. 11e. In yet another operating mode, the words displayed by control circuit 40 on display 14d above the down arrow soft key 3d and up arrow soft key 3u are "REVERSE" and "FORWARD" respectively as shown in FIG. 11f. In another mode, graphical icons indicating a "Thumbs down" or "Thumbs up" are displayed on display 14d above the down arrow soft key 3d and up arrow soft key 3u respectively as shown in FIG. 11g.

It can be seen that it is highly advantageous and useful to provide soft keys 3 with the particular combination of a down arrow key 3d and an up arrow key 3u (or the reverse) formed thereon in a permanent graphic. It is particularly useful to provide the marking of a down arrow and up arrow on soft keys 3 because these particular combinations of markings graphically reinforce many different combinations of word indicia including (in any language) "DOWN/UP," "NO/YES," "DECREASE/INCREASE," "DISAGREE/AGREE," "CANCEL/ACCEPT," and "FORWARD/

REVERSE." Without arrows or similar indicia formed on soft keys 3 in permanent graphics there would be no graphical reinforcement of the indicia displayed by display 14d above soft keys 3.

The soft keys 3 may also be used for a variety of purposes including, but not limited to selecting between one of two possible input selections as is indicated with reference to FIGS. 11a–11g adjusting input data or changing the internal system values of parameters like contrast and volume control. The display 14d would be able to show either a graphical or numerical representation of the adjusted values and the soft keys effect on it.

Figure 12A:
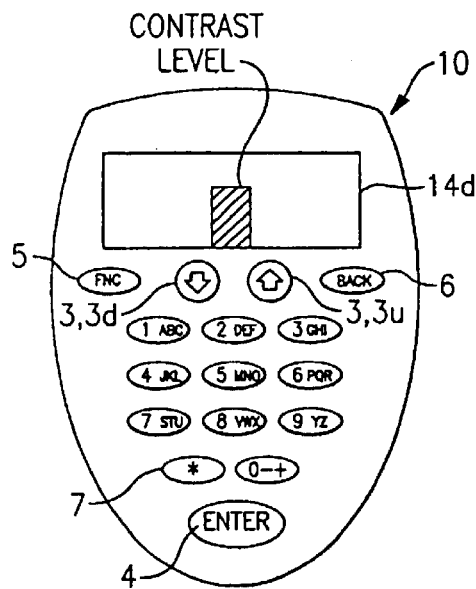
FIGS. 12a–12d are a series of reader keyboard schematic diagrams illustrating another function of a soft key of the invention.
Figure 12B:
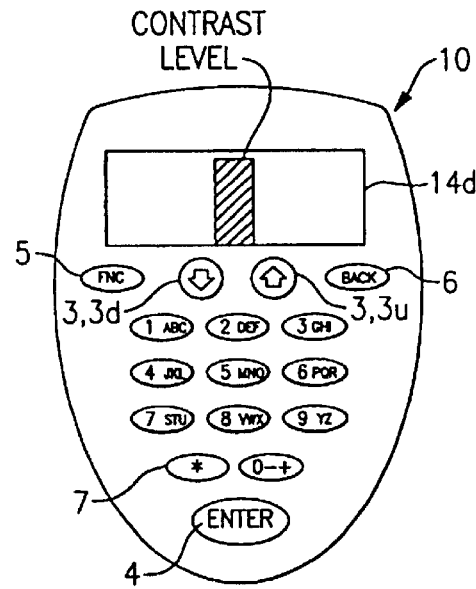
Figure 12C:
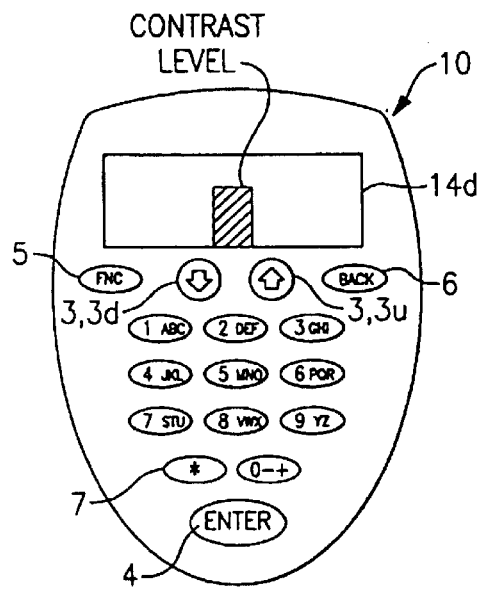
Figure 12D:
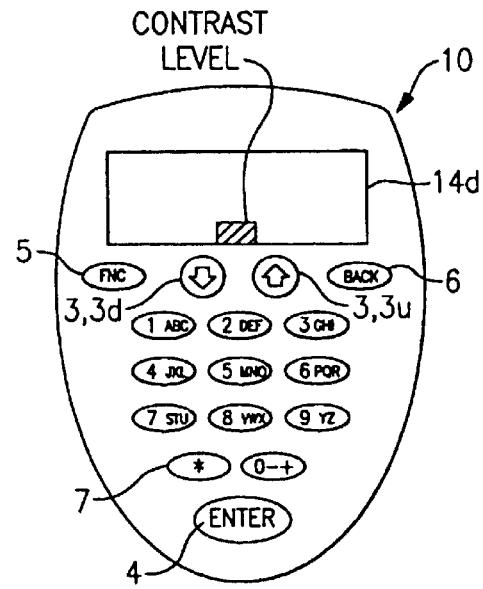

More specifically, a value or parameter shown on the display 14d may be increased or decreased by pressing the up arrow soft key 3u or the down arrow soft key 3d respectively. In a system parameter example such as contrast control represented by a bar graphic in FIGS. 12a–12d, depressing the up arrow soft key 3u increases contrast as seen in FIGS. 12a–13b and pressing the down arrow key 3d decreases contrast as seen in FIGS. 12c–12d.

Figure 13A:
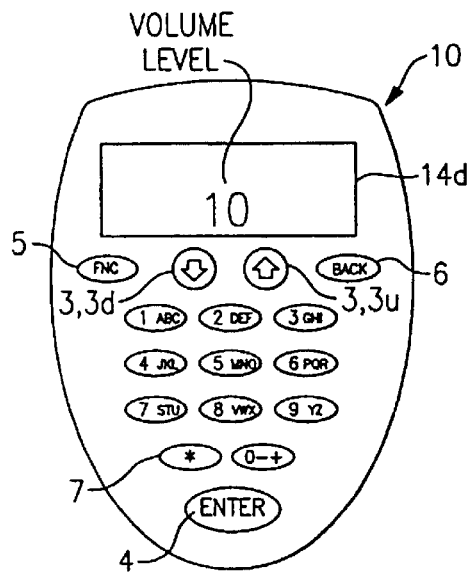
FIGS. 13a–13d are a series of reader keyboard schematic diagrams illustrating another function of a soft key according to the invention.
Figure 13B:
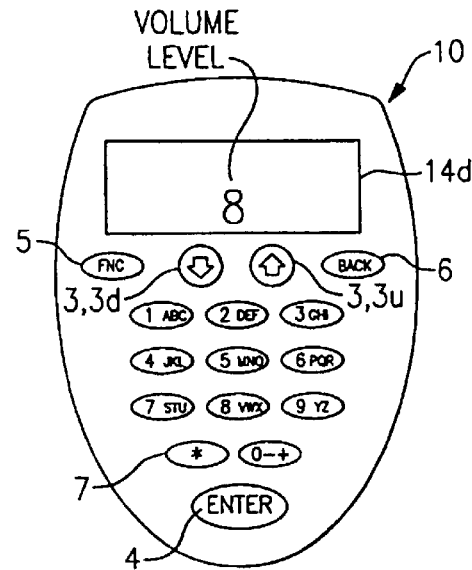
Figure 13C:
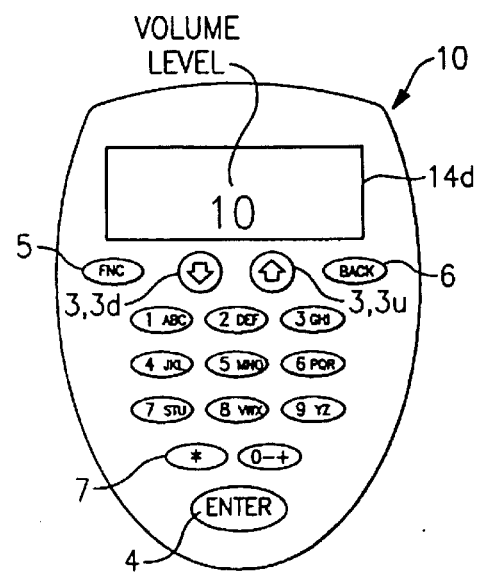
Figure 13D:
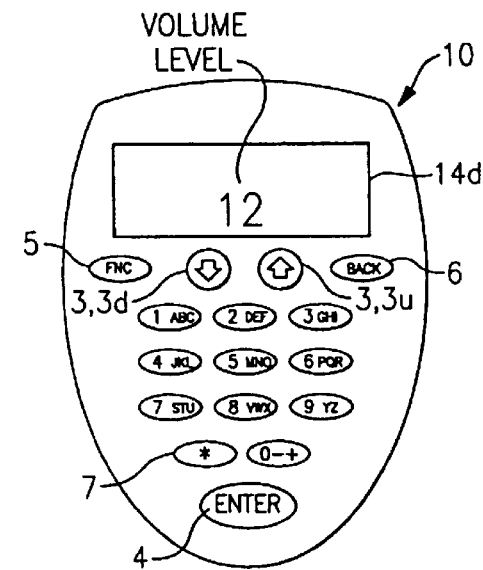
Figure 14A:
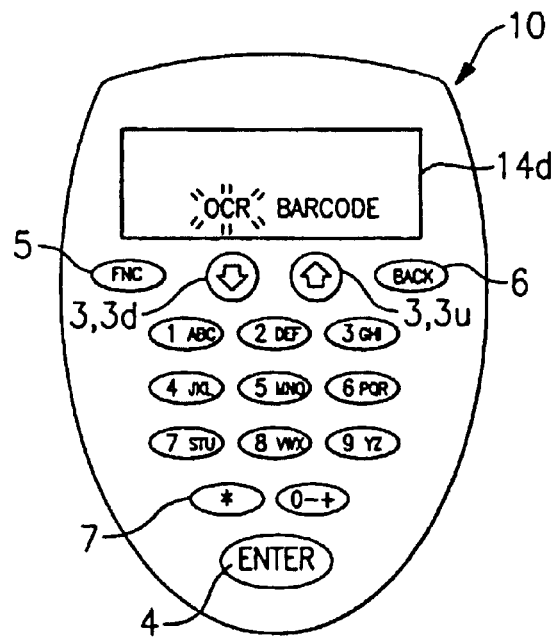
FIGS. 14a–14b are a series of reader keyboard schematic diagrams illustrating a selection feature of a soft key according to the invention.
Figure 14B:
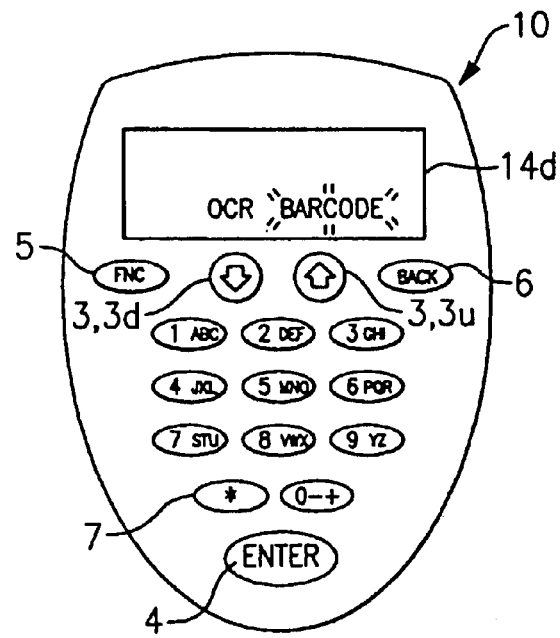
Figure 15A:
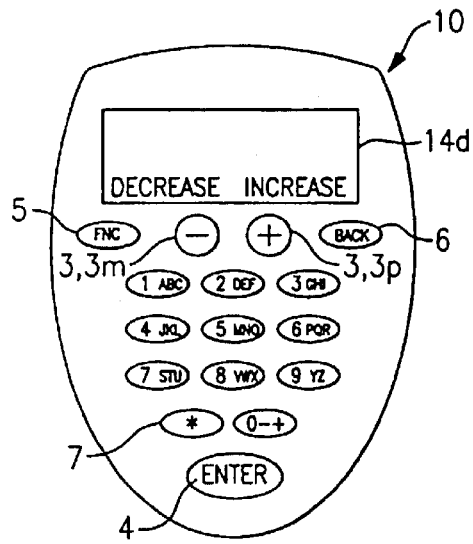
FIGS. 15a–15d are a series of reader keyboard schematic diagrams illustrating alternatively designed soft keys according to the invention.
Figure 15B:
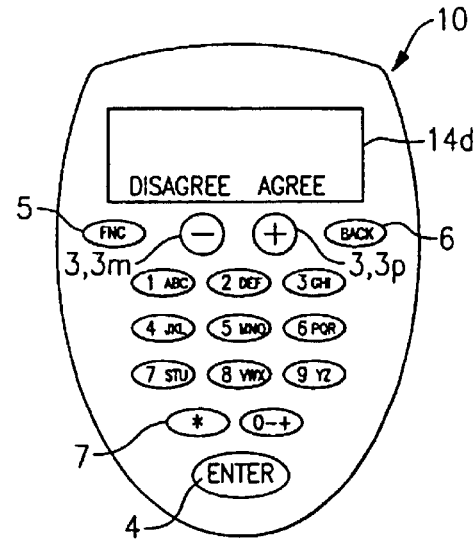
Figure 15C:
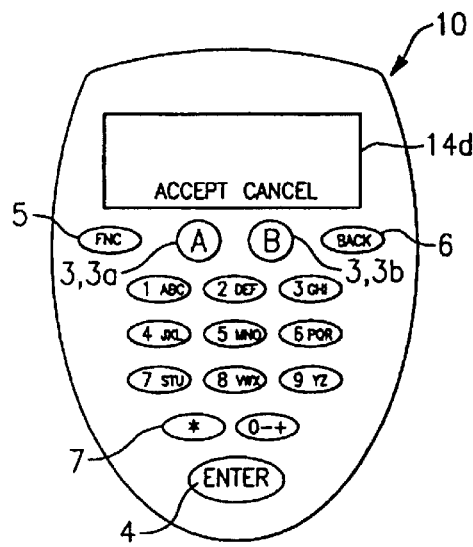
Figure 15D:
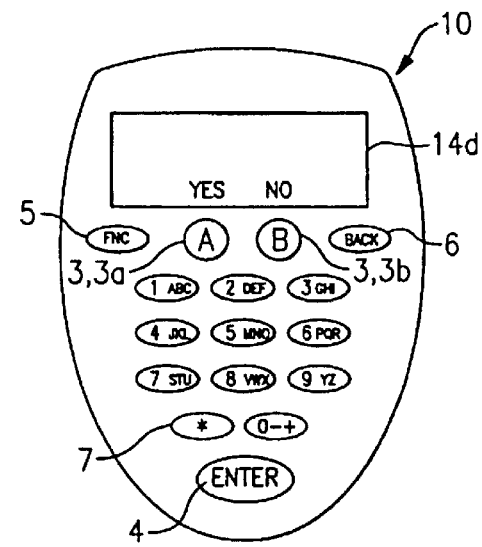

In a numerical example, the number 10 representing current volume level may be reduced by depressing the down arrow key 3d as shown in FIGS. 13a–13b or increased by depressing the up arrow soft key 3u as shown in FIGS. 13c–13d.

In another example, a user may wish to select between two different applications, for example, two different decoding algorithms such as between OCR-barcode decoding and barcode-only decoding. Graphical representations of the decoding options tools may be represented by an "OCR" and "BARCODE" messages respectively on the display directly above the down and up soft arrow keys. The user would select the OCR barcode option by depressing the down arrow soft key 3d as shown in FIG. 13a and the user would select the barcode only option by depressing the up arrow soft key 3u as shown in FIGS. 13b.

Figure 9A:
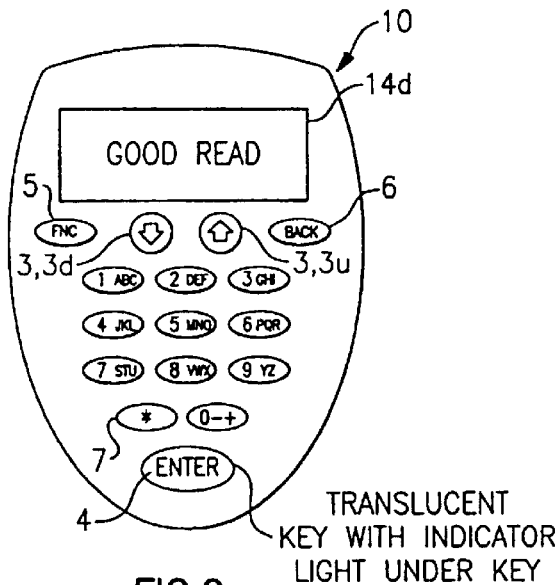
FIGS. 9a–9h are a series of reader keyboard schematic diagrams illustrating a series of examples using translucent keys with indicator lights placed underneath to indicate various conditions including good read.
Figure 9B:
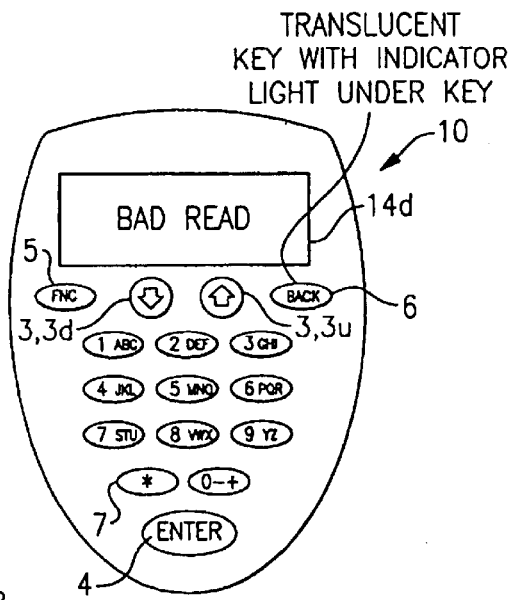

In another embodiment of the invention, the soft keys positioned adjacent the display may be externally labeled with various other graphics or alphanumeric text. For example, as is indicated in FIGS. 9a and 9b, one of the soft keys may be labeled with a "PLUS (+)" sign while the other soft key is labeled with a "MINUS (−)" sign. These inscribed indicia can have the same reinforcing function as described in previous examples. More specifically, the word "DECREASE" can appear above the minus indicia soft key and the word "INCREASE" can appear above the plus indicia soft key as shown in FIG. 9a. In another example, the word "DISAGREE" can appear in the display above the minus sign and the word "AGREE" can appear in the display above the plus sign as shown in FIG. 9b. It will be seen that the remaining examples of message combinations described with reference to FIGS. 11a–11g, namely the examples of the combination of "DECREASE/INCREASE," "DISAGREE/AGREE," "CANCEL/ACCEPT," "REVERSE/FORWARD," are graphically reinforced by a combination of a minus-sign (−) soft key 3m and a plus-sign (+) soft key 3p in the same manner that they are graphically reinforced by a pair of soft keys having a down arrow and an up arrow permanently formed therein.

Figure 9C:
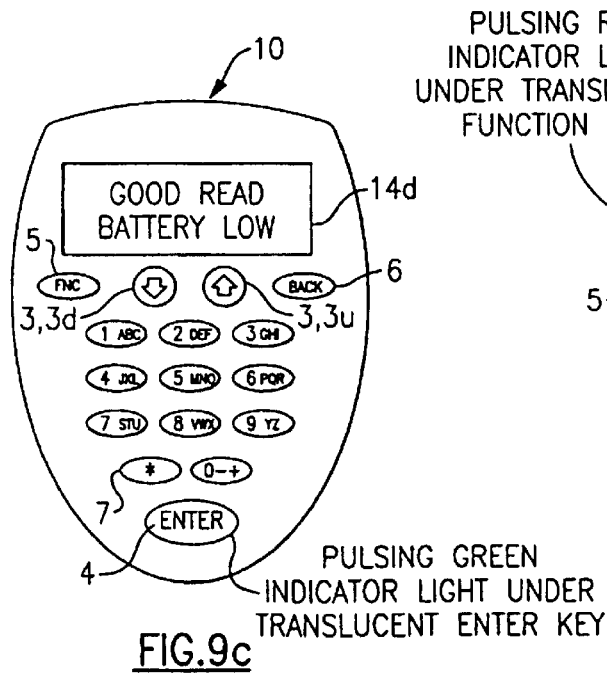

In another embodiment, the two soft keys may be labeled with the letters A and B. The words "ACCEPT" and "CANCEL" may be shown above the soft keys A and B respectively as shown in FIG. 9c or the words "YES" and "NO" may be shown above the same respective keys as shown in FIG. 9d. It is seen that the example explained with reference to FIGS. 11a–11g would be graphically reinforced by an "A" labeled soft key 3a in combination with a "B" labeled soft key 3b. These alternative delineations have the same effect of graphically reinforcing what is shown on the display as did the arrow marked soft keys in the previously discussed embodiments.

It is seen that soft keys 3 can be positioned on head 8 in positions other than below display 14d. In the example of FIG. 5e, soft keys are positioned laterally adjacently related to display 14d. In the example of FIG. 11f, a duplicate set of soft keys 3 are positioned adjacently above display 14d.

Reader 10 preferably incorporates an intermediate level or "script" program such as TCL (Tool Command Language), Python, or Digital. These programs are advantageous relative to a high level language like C++ or Fortran because of their simplicity, versatility, and familiarity. TCL may be the most preferred because of its open source and strong developer community.

The reader display 14d is designed to show graphical and text information in an easily readable and viewable manner. The display 14d itself could be any desired type including LED or LCD. The display technology is suited for a wide viewing angle and maximum contrast. Comfortable viewing angles are generally between 95 and 115 degrees with a nominal viewing angle of 105 degrees. The display 14d can be mounted at an angle to allow viewing without the operator having to bend a hand or wrist at or near the end of a comfortable range of motion.

When successfully decoding a bar code or OCR character, reader 10 indicates to a user that decoding has been successful. Features relating to the reader's processing of image data and decoding of decodable indicia are described in detail in copending application Ser. No. 09/904,697, filed Jul. 13, 2001, entitled "An Optical Reader Having a Color Imager," incorporated herein by reference.

According to the invention, reader 10 may incorporate a plurality of decode status indicators, otherwise known as "good read" indicators. In the embodiment shown in FIGS. 1a–1d reader 10 includes an enlarged good read indicator panel 14GP located at rear 9 of head 8 which is most visible from a rear viewing perspective as is indicated by the rear perspective view in FIG. 1d (but which is also visible from a top perspective), and a key-associated good read indicator 14GK associated with a key of keyboard 13k. As best seen by the side view shown in FIG. 1b, good read indicator 14GP is also highly visible from a side view viewing perspective. The curvature of rear 9 allows indicator 14GP to be readily viewed from a side perspective when it is disposed in rear 9. Key-associated good read indicator 14GK is most visible from a top perspective as indicated by the top perspective views in FIG. 1c. The providing of more than one good read indicator at a plurality of locations on reader 10 enhances an operator's capacity to observe a good read indicator from a variety of viewing perspectives. Providing good read indicators on the reader 10 specifically at the rear 9 and top of head 8 enables reader 10 to provide the best viewing angle for viewing one of the indicators the rear perspective and top perspective viewing, angles which are substantially at the extremes of what can be considered normal viewing perspectives during reading operations. Redundant good read indicators e.g., 14GP and 14GK are also advantageous in that an operator is still provided with a good read indication even in the event that one of the indicators requires replacement of an associated light source or is otherwise out of service.

Good read indicators 14GP and 14GK may be multiple color-emitting indicators which emit a different color light depending on the status of the reader's attempt to decode a decodable indicia. For example, indicators 14GP and 14GK may emit red light when decoding fails, green light when decoding is successful, and yellow light when a decoding attempt is in process.

Reader 10 may have good read indicators in addition to or in place of good read indicators 14GP and 14GK. For example, display 14D may have an associated light source 14DGL, such as a backlight LCD panel, typically provided by an electroluminescent panel or diffuser cold cathode flourescent lamp (CCFL) combination. Reader 10 may be configured so that the status of decoding is indicated by the light emission characteristics of display-associated light source 14DGL. Reader 10 can also be configured so that light source 14DGL indicates another status condition as is indicated by the duplicate labeling with element 14DGL as element 14DSL. Reader 10 can also be configured so that the status of decoding is indicated by graphical indicia displayed on display 14d. Reader 10 may also comprise a traditional good read indicator 14G provided by a single light source. Still further, face plate 8F may have an associated light source 8L for light plate 8F and control circuit 40 may be configured to control source 8GL to indicate a decode status condition of reader 10 or another status condition as is indicated by its labeling, in duplicate, as element 85L. Element 14G in FIGS. 1a, 1c, and 1d may also represent an element of an acoustical output as is indicated by the duplicate labeling of element 14G and ASF element 14A.

Reader 10 can also be adapted so that the status condition indicators 14GP, 14GK, 14DL, and 8GL described hereinabove indicate the status of a condition other than the state of decoding. For example, reader 10 can be configured so that one or more of indicators 14GP, 14GK, 14GL, and 8GL indicate such status conditions as ranging status (whether the reader is or is not in an operative range), and battery level status. Indicator 14GP is labeled element 14SP in duplicate in FIG. 1a to indicate that reader 10 can be configured so that indicator 14SP indicates a status condition other than a decoding status. Indicator 14GK is labeled element 14SK in duplicate to indicate that reader 10 can be configured so that indicator 14SK indicates a status condition other than a decoding status. Light source 14DGL is labeled element 14DSL in duplicate in FIG. 4e to indicate that reader 10 can be configured so that light source 14DSL can indicate a status condition other than a decoding status. Indicator 8GL in FIG. 4f is labeled element 8GL in FIG. 4f to indicate that light source 8GL can indicate a status condition other than decoding.

Examples of alternative housing configurations for reader 10 are shown in FIGS. 2a–2f. It is seen that the housings of readers 10-2, 10-3, 10-4, and 10-5 comprise head portions only and do not comprise handles. Reader 10-2 of FIG. 2a is an alternatively formed optical reader data collection device. Reader 10-3 of FIGS. 2b and 2c is a mobile telephone incorporating an optical reader. Reader 10-4 of FIGS. 2d and 2e is a personal data assistant device (PDA) incorporating an optical reader. Reader 10-5 of FIGS. 2f and 2g is a digital camera incorporating an optical reader.

Block diagrams illustrating various types of electronic hardware configurations for optical imaging devices in which the invention may be incorporated and communication systems comprising at least one optical reader described with reference to FIGS. 3a–3e. Referring to FIG. 3a, optical reader 10a includes an optical reader processor assembly 30. The elements depicted in FIG. 3a are typical of a keyboardless and displayless optical reader, which nevertheless may incorporate features of the invention described herein.

Optical reader processor assembly 30, includes an illumination assembly 21 for illuminating a target area T, such as a substrate bearing a 1D or 2D bar code symbol or a text string, and an imaging assembly 33 for receiving an image of object T and generating an electrical output signal indicative of the data optically encoded therein. Illumination assembly 21 may, for example, include an illumination source assembly 22, together with an illuminating optics assembly 24, such as one or more lenses, diffusers, wedges, reflectors, or a combination of such elements, for directing light from light source 22 in the direction of a target object T. Illumination assembly 21 may comprise, for example, laser or light emitting diodes (LEDs) such as white LEDs or red LEDs. Illumination assembly 21 may include target illumination optics 24 for projecting an aiming pattern 27 on target T. Illumination assembly 21 may be eliminated if ambient light levels are certain to be high enough to allow high quality images of object T to be taken. Illumination assembly 21 may also be located remote from optical reader housing 11, at a location so as to eliminate or reduce specular reflections. Imaging assembly 33 may include an image sensor 32, such as a color or monochrome 1D or 2D CCD, CMOS, NMOS, PMOS, CID, or CMD solid state image sensor, together with an imaging optics assembly 34 for receiving and focusing an image of object T onto image sensor 32. The array-based imaging assembly shown in FIG. 3a may be replaced by a laser array-based imaging assembly comprising one or more laser sources, a scanning mechanism, emit and receive optics, at least one photodetector, and accompanying signal processing circuitry.

Optical reader processor assembly 30 of the embodiment of FIG. 3a also includes programmable control circuit 40 which preferably comprises an integrated circuit microprocessor 42 and a field programmable gate array (FPGA 44). The function of FPGA 44 could also be provided by an application specific integrated circuit (FPGA 44).

Processor 42 and FPGA 44 are both programmable control devices which are able to receive, output, and process data in accordance with a stored program stored in memory unit 45 which may comprise such memory elements as a volatile or non-volatile read/write random access memory or RAM 46, 46-1 and an erasable read only memory or EROM 47, 47-1. Memory 45 may also include one or more long term non-volatile memory storage devices (48, 45). For example, storage device 48, 45 may include e.g. a hard drive, or floppy disk to which data can be written to or read from. Storage device 48, 45 can be of a type that is securely installed in housing 11 (e.g. a hard drive) or can be of a type that can be removed from housing 11 and transported (e.g. a floppy disk).

Memory 45 can include what is referred to as a "flash" memory device. Several standardized formats are available for such flash memory devices including: "Multimedia" (MMC), "Smart Media," "Compact Flash," and "Memory Stick." Although the transfers of data between processor 40 and a flash memory device normally involve "blocks" of data and not "bytes" of data as in standardly known nonvolatile RAM device, the operation of a "flash" memory device is similar to a standardly known non-volatile RAM memory device. Accordingly, a flash memory device can be considered to be represented by the one or more RAM blocks 46 of FIGS. 3a–3e. As is well known, flash memory devices are commonly available in a form that allows them to be removed from a first device and transported to a second device, e.g. between device 10 and device 68. Flash memory devices are particularly well suited for storing image data.

Processor 42 and FPGA 44 are also both connected to a common bus 49-1 through which program data and working data, including address data, may be received and transmitted in either direction to any circuitry that is also connected thereto. Processor 42 and FPGA 44 differ from one another, however, in how they are made and how they are used.

More particularly, processor 42 is preferably a general purpose, off-the-shelf VLSI integrated circuit microprocessor which has overall control of the circuitry of FIG. 2a, but which devotes most of its time to decoding decodable image data such as symbology or text character data stored in RAM 46, 46-1 in accordance with program data stored in EROM 47, 47-1. FPGA 44, on the other hand, is preferably a special purpose VLSI integrated circuit, such as a programmable logic or gate array, which is programmed to devote its time to functions other than decoding image data, and thereby relieve processor 42 from the burden of performing these functions.

The actual division of labor between processor 42 and FPGA 44 will naturally depend on the type of off-the-shelf microprocessors that are available, the type of image sensor which is used, the rate at which image data is output by imaging assembly 33, etc. There is nothing in principle, however, that requires that any particular division of labor be made between processors 42 and 44, or even that such a division be made at all.

With processor architectures of the type shown in FIG. 3a, a typical division of labor between processor 42 and FPGA 44 will be as follows. Processor 42 is preferably devoted primarily to such tasks as decoding image data in response to trigger 13t being activated, once such data has been stored in RAM 46, 46-1 and, recognizing characters represented in stored image data according to an optical character recognition (OCR) scheme in response to an actuation of trigger 13t. Processor 42 also may control aural output device 14a and good read indicator light sources 124 and 14g as are described herein.

FPGA 44 is preferably devoted primarily to controlling the image acquisition process, the A/D conversion process, and the storage of image data, including the ability to access memories 46-1 and 47-1 via a DMA channel. FPGA 44 may also perform many timing and communication operations. FPGA 44 may, for example, control the illumination of LEDs 22, the timing of image sensor 32 and an analog-to-digital (A/D) converter 36-1, the transmission and reception of data to and from a processor system external to assembly 30, through an RS-232, a network such as an ethernet, a serial bus such as USB, a wireless communication link (or other) compatible I/O interface as is indicated by interface 37-2. FPGA 44 may also control the outputting of user perceptible data via an output device, such as a display monitor which may be provided by a liquid crystal display such as display 14d. Control of output, display and I/O functions may also be shared between processors 42 and 44, as suggested by bus driver I/O interface 37-3 or duplicated, as suggested by microprocessor serial I/O interface 37-1 and interface 37-2. As explained earlier, the specifics of this division of labor is of no significance to the present invention.

Figure 3F:
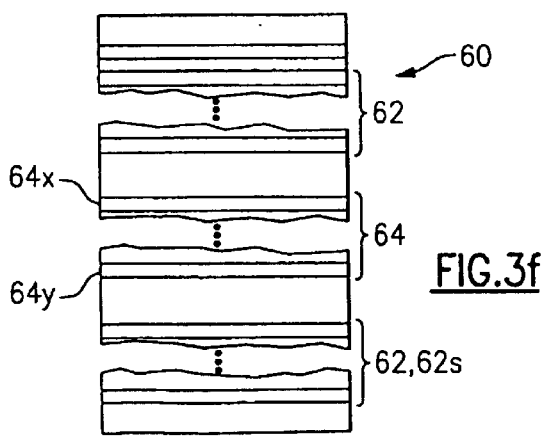
FIG. 3f illustrates a memory map.
Figure 3B:
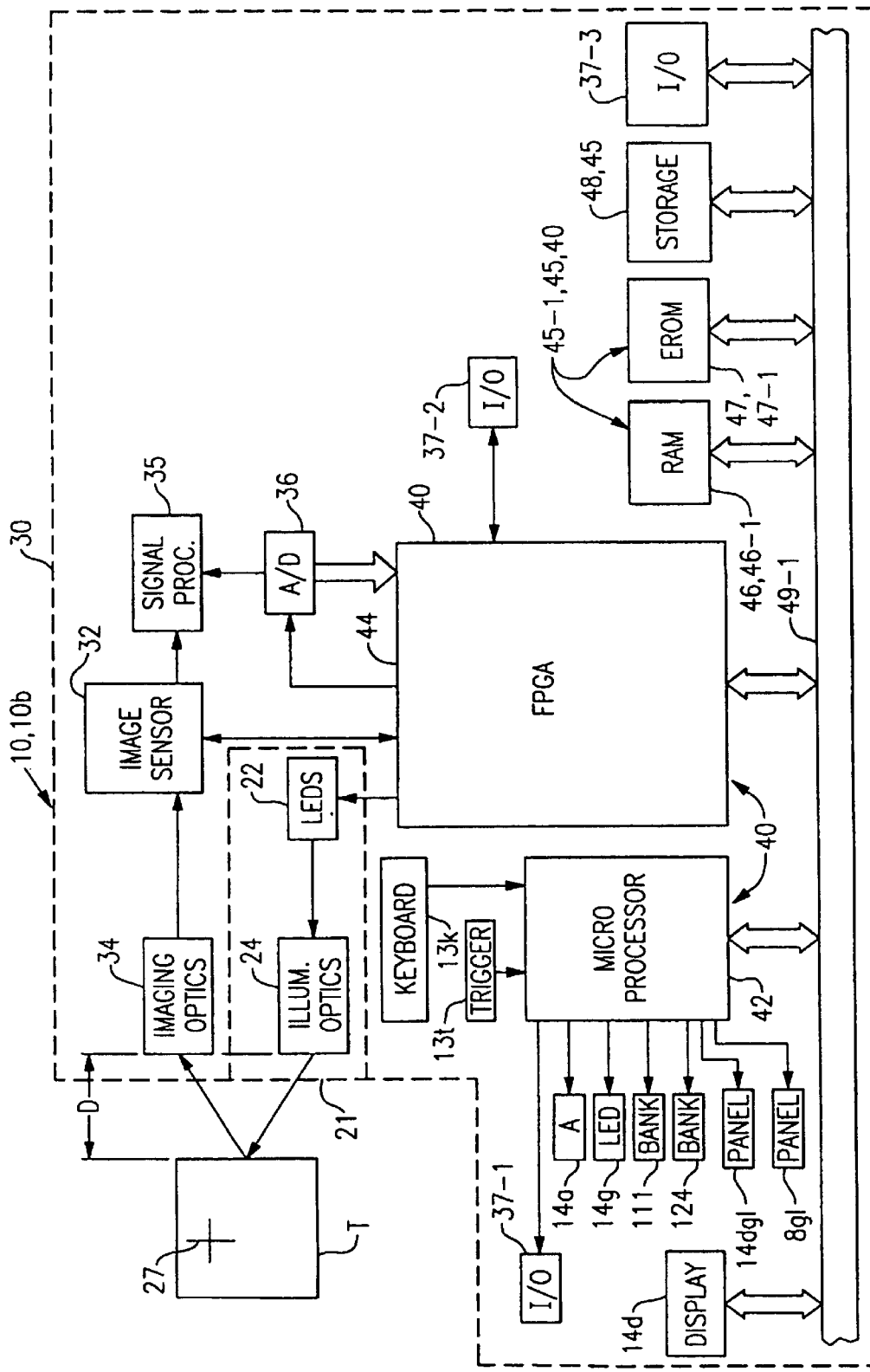
Figure 3C:
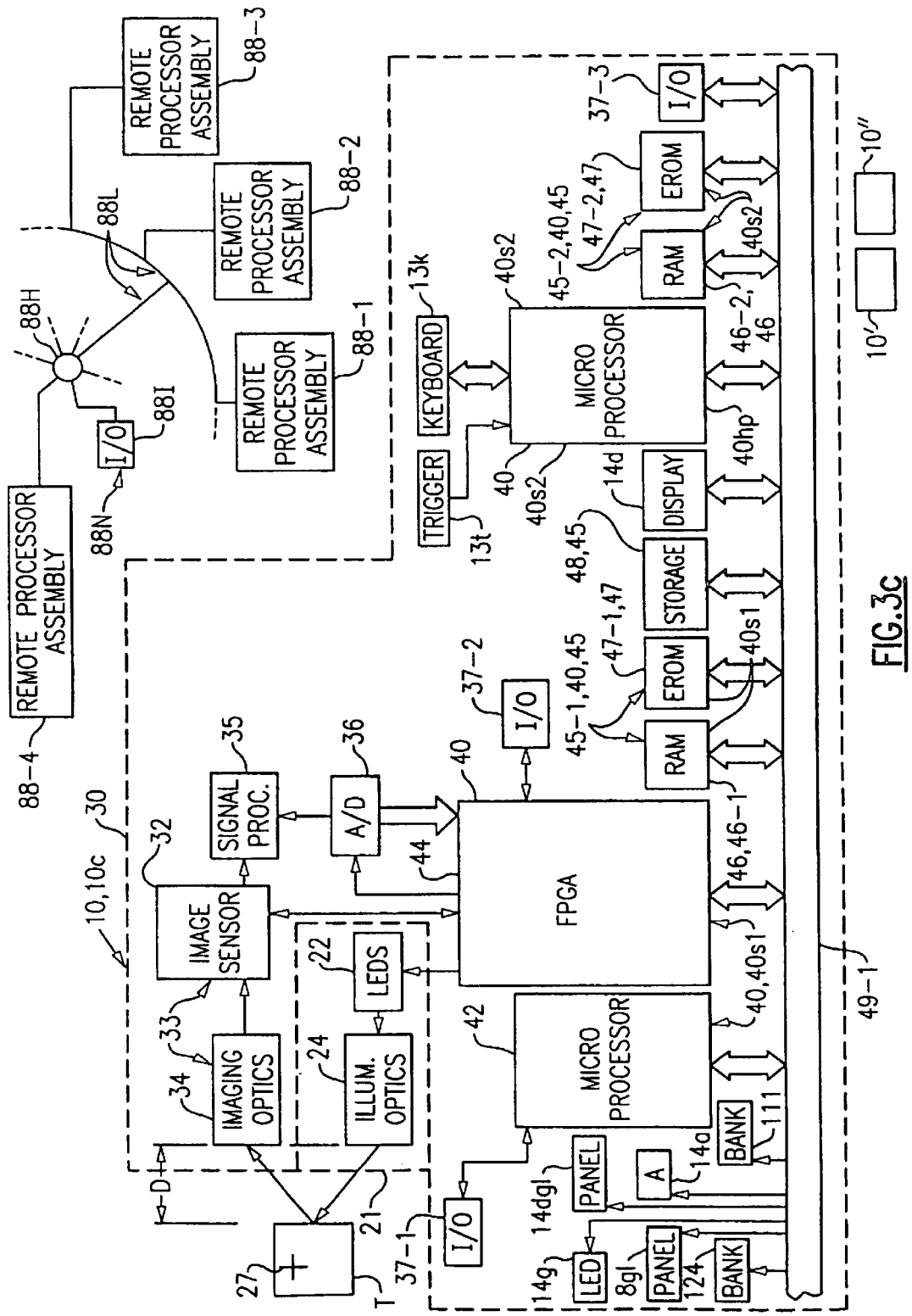
Figure 3D:
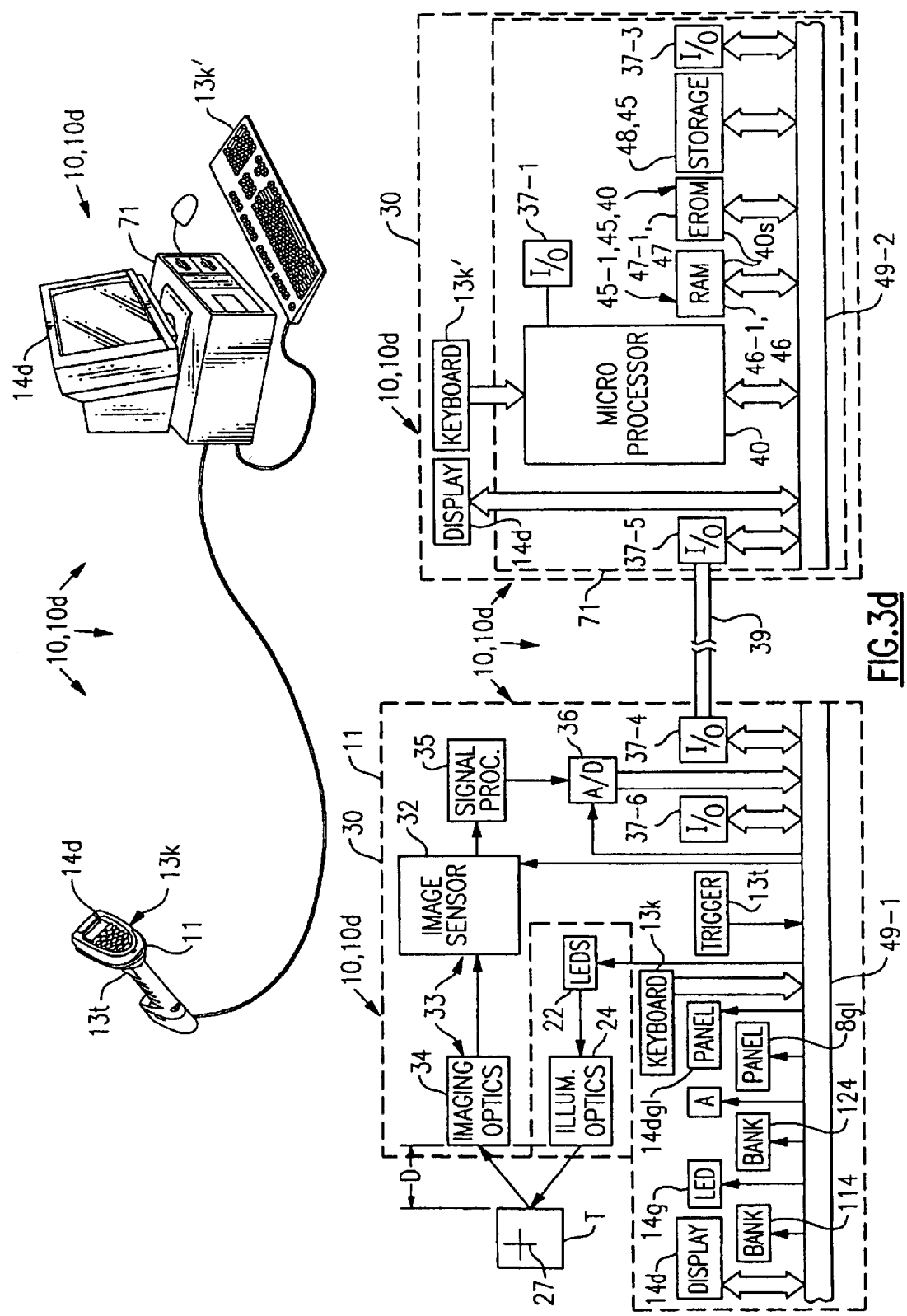

FIG. 3b shows a block diagram exemplary of an optical reader which is adapted to easily receive user-input control instructions resulting in a change in an operating program of a imaging device. In addition to having the elements of single state optical reader circuit of FIG. 3a, optical reader 10b includes a keyboard 13k for inputting data including instructional data and a display 14d for displaying text and/or graphical information to an operator. Keyboard 13k may be connected to bus 49-1, FPGA 44 or to processor 42 as indicated in FIG. 2b. Display 14d may be connected to FPGA 44, to processor 42 or to system bus 49-1 as is indicated in the particular embodiment of FIG. 3b. In addition to controlling acoustic output 14a, single LED good read indicator 14b, and bank 114, processor 42 may be configured to control bank 124, panel DGL 42 and panel 14 DGL. These output devices can also be connected to bus 49-1 as indicated in FIGS. 3c and 3d for control either by a microprocessor e.g. 42, 40hp, and 70p non-integrated microprocessor 40 of assembly 71.

An operator operating optical reader 10b can reprogram optical reader 10b in a variety of different ways. In one method for reprogramming optical reader 10b, an operator actuates a control button of keyboard 13k which has been pre-configured to result in the reprogramming of optical reader 10b. In another method for reprogramming optical reader 10b an operator actuates control of a processor system not integral with optical reader 10b to transmit an instruction to reprogram optical reader 10b. According to another method for reprogramming optical reader 10b, an operator moves optical reader 10b so that a "menu symbol" is in the field of view of image sensor 32 and then activates trigger 13t of optical reader 10b to capture an image representation of the menu symbol. A menu symbol is a specially designed bar code symbol which, when read by an appropriately configured optical reader results in an optical reader being programmed. The reprogramming of an optical reader with use of a menu symbol is described in detail in commonly assigned U.S. Pat. No. 5,965,863 incorporated herein by reference. Because the second and third of the above methodologies do not require actuation of an optical reader control button of keyboard 13k but nevertheless result in an optical reader being reprogrammed, it is seen that optical reader 10 may be keyboardless but nevertheless reprogrammable. It will be seen that the second or third of the above methodologies can be adapted for selecting operating modes described herein.

A typical software architecture for an application operating program typically executed by an optical reader as shown in FIG. 3b is shown in FIG. 3f depicting a memory map of a program stored in program memory 47-1. Application operating program 60 adapts an optical reader for a particular application. Three major applications or functions for an optical reader having image capture capability are: (1) comprehensive decoding; (2) data transfer; and (3) signature capture. In a comprehensive decoding application, optical reader 10 may preliminarily analyze and then decode a message corresponding to a bar code symbol or OCR decodable text character. In a data transfer application, optical reader 10 p uploads character text files or image files to a processor system located externally relative to optical reader housing 11. In a signature capture application, optical reader 10 may capture an image corresponding to a scene having a signature, parse out from the image data that image data corresponding to a signature, and transmit the captured signature data to another processing system. It is seen that the third of such applications can be carried out by an optical reader that is not an optical reader decoder equipped with decoding capability. Numerous other application operating programs are, of course possible, including a specialized ID decoding application, a specialized 2D bar code decoding algorithm, a specialized OCR decoding application which operates to decode OCR decodable text characters, but not bar code symbols. A user of an optical reader configured in accordance with the invention accesses a mode selector menu driver as exemplified by the embodiment shown in FIG. 1a when a decoding function of the optical reader is actuated.

Referring now to specific aspects of the software architecture of an operating program 60, program 60 includes an instruction section 62, and a parameter section 64. Further, instruction section 62 may include selectable routine section 62s. Instructions of instruction section 62 control the overall flow of operations of optical reader 10. Some instructions of instruction section 62 reference a parameter from a parameter table of parameter section 64. An instruction of instruction section 62 may state in pseudocode, for example, "set illumination to level determined by [value in parameter row x]." When executing such an instruction of instruction section 62, control circuit 40 may read the value of parameter row 64x. An instruction of instruction section 62 may also cause to be executed a selectable routine, that is selected depending on the status of a parameter value of parameter section 64. For example, if the application program is a bar code decoding algorithm then an instruction of instruction section 62 may state in pseudocode, for example, "launch" Maxicode decoding if Maxicode parameter of parameter row 64y is set to "on." When executing such an instruction, control circuit 40 polls the contents of row 64y of parameter section 64 to determine whether to execute the routine called for by the instruction. If the parameter value indicates that the selectable routine is activated, control circuit 40, executes the appropriate instructions of routine instruction section 62s to execute the instruction routine.

It is seen, therefore, that the above described software architecture facilitates simplified reprogramming of optical reader 10. Optical reader 10 can be reprogrammed simply by changing a parameter of parameter section 64 of program 60, without changing the subroutine instruction section 62s or any other code of the instruction section 62 simply by changing a parameter of parameter section 64. The parameter of a parameter value of section 62 can be changed by appropriate user control entered via keyboard 13k, by reading a menu symbol configured to result in a change in parameter section 64, or by downloading a new parameter value or table via a processor system other than system 40 as shown in FIGS. 3a and 3b. The reprogramming of optical reader 10b can of course also be accomplished by downloading an entire operating program including sections 62 and 64 from a processor system other than a system as shown in FIGS. 3a and 3b.

Another architecture typical of an optical reader which may be configured in accordance with the invention is shown in FIG. 3c. Optical reader 10c comprises a control circuit 40 having a processor system 40s1, and an integrated host processor system 40s2 which includes host processor 40hp and an associated memory 45-2. "Host processor system" herein shall refer to any processor system which stores an optical reader application operating program for transmission into a processor system controlling operation of an optical reader imaging system 33 or which exercises supervisory control over a processor system controlling operation of an optical reader imaging system 33, or which stores in its associated memory more than one application operating program that is immediately executable on reception of a command of a user. In an optical reader having two processors such as processor 42 and processor 40hp, processor 42 is typically dedicated to processing image data to decode decodable indicia, whereas processor 40hp is devoted to instructing processor 42 to execute decoding operations, receiving inputs from trigger 13t and keyboard 13k, coordinating display and other types of output by output devices 14d, 14g, and 14a and controlling transmissions of data between various processor systems.

In architectures shown in FIG. 3c having dedicated decoding processor system 40s1 and a powerful, supervisory host processor system 40s2, host processor system 40s2 commonly has stored thereon an operating system, such as DOS WINDOWS or WINDOWS, or an operating system specially tailored for portable devices such as, WINDOWS CE available from Microsoft, Inc. In the case that host processor system 40s2 includes an operating system such as DOS or WINDOWS CE, the instruction section and parameter section of the operating program controlling the operation of host processor system 40s2 normally are programmed in a high level programming language and assembled by an assembler before being stored in memory 47-2 and therefore may not reside in consecutive address locations as suggested by program 60 shown in FIG. 3f. Nevertheless, host processor system 40s2 having an operating system integrated thereon can readily assemble an operating program into such a form for loading into an external processor system that does not have an operating system stored thereon.

Referring to further aspects of imaging devices 10a, 10b, and 10c at least one I/O interface e.g. interface 37-1, 37-2, and 37-3 facilitates local "wired" digital communication such as RS-232, ethernet, serial bus including Universal Serial Bus (USB), or local wireless communication technology including "Blue Tooth" communication technology. At least one I/O interface, e.g. interface 37-3, meanwhile, facilitates digital communication with remote processor assembly 88-1 in one of an available remote communication technologies including dial-up, ISDN, DSL, cellular or other RF, and cable. Remote processor assembly 88-1 may be part of a network 88N of processor systems as suggested by assemblies 88-2, 88-3, and 88-4 links 88L and hub 88H e.g. a personal computer or main frame computer connected to a network, or a computer that is in communication with optical reader 10c only and is not part of a network. The network 88N to which assembly 88-1 belongs may be part of the internet. Further, assembly 88-1 may be a server of the network and may incorporate web pages for viewing by the remaining processor assemblies of the network. In addition to being in communication with optical reader 10c, assembly 88-1 may be in communication with a plurality of additional imaging devices 10' and 10". Optical reader 10c may be part of a local area network (LAN). Optical reader 10 may communicate with system 88-1 via an I/O interface associated with system 88-1 or via an I/O interface 88I of network 88N such as a bridge or router. Further, a processor system external to processor system 40 such as processor system 70s may be included in the communication link between optical reader 10 and assembly 88-1. While the components of imaging devices 10a, 10b, and 10c are represented in FIGS. 3a–3c as discreet elements it is understood that integration technologies have made it possible to form numerous circuit components on a single integrated circuit chip. For example, with present fabrication technologies, it is common to form components such as components 42, 40, 46-1, 47-1, 37-2, and 37-1 on a single piece of silicone.

Furthermore, the number of processors of optical reader 10 is normally of no fundamental significance to the present invention. In fact, if processor 42 is made fast enough and powerful enough special purpose FPGA processor 44 can be eliminated. Likewise, referring to optical reader 10c, a single fast and powerful processor can be provided to carry out all of the functions contemplated by processors 40hp, 42, and 44 as is indicated by the architecture of optical reader 10e of FIG. 3e. Still further, it is understood that if optical reader 10 includes multiple processors the processors may communicate via parallel data transfers rather than via the serial communication protocol indicated by serial buses 49-1 and 49-2. In addition, there is no requirement of a one-to-one correspondence between processors and memory.

Processors 42 and 40hp shown in FIG. 3c could share the same memory, e.g. memory 45-1. A single memory e.g. memory 45-1 may service multiple processors e.g. processor 42 and processor 40 hp. Referring to the embodiment of FIG. 3d, it is seen that it is not necessary that the entirety of electrical components of an optical reader 10 be incorporated in a portable device housing 11. The electrical components of optical reader 10d are spread out over more than one circuit board that are incorporated into separate device housings 11 and 71. It is understood that circuitry could be spread out into additional housings. Control circuit 40 in the embodiment of FIG. 3d is incorporated entirely in the housing 71 that is non-integral with portable device housing 11. Housing 71 is shown as being provided by a personal computer housing, but could also be provided by another type of housing such as a cash register housing, a transaction terminal housing or a housing of another portable device such as housing 11. At least one operating program for controlling imaging assembly 33 and for processing image signals generated from imaging assembly 33 is stored in EROM 47-1 located within PC housing 71. For facilitating processing of signals generated from imaging assembly 33 by a processor system that is not integrated into portable housing 11 a high speed data communication link should be established between imaging assembly 33 and processor system 40. In the embodiment of FIG. 3d, I/O interfaces 37-4 and 37-5 and communication link 39 may be configured to operate according to the USB data communication protocol. The configuration shown in FIG. 3d reduces the cost, weight, and size requirements of the portable components of optical reader 10d, which in optical reader 10-4 are the components housed within portable housing 11. Because the configuration of FIG. 3d results in fewer components being incorporated in the portable section 11 of optical reader 10d that are susceptible to damage, the configuration enhances the durability of the portable section of optical reader 10-4 delimited by housing 11.

The control circuit 40 as shown in the embodiment of FIG. 3d can be in communication with more than one "shell" processorless optical reader comprising an optical reader housing and an optical reader circuitry shown by the circuitry within dashed housing border 11 of FIG. 3d. In the case that a control circuit as shown in FIG. 3d services many "shell" imaging devices or processor-equipped imaging devices input/output port 37-5 should be equipped with multiplexing functionality to service the required data communications between several imaging devices and/or shell imaging devices and a single processor system.

Figure 3E:
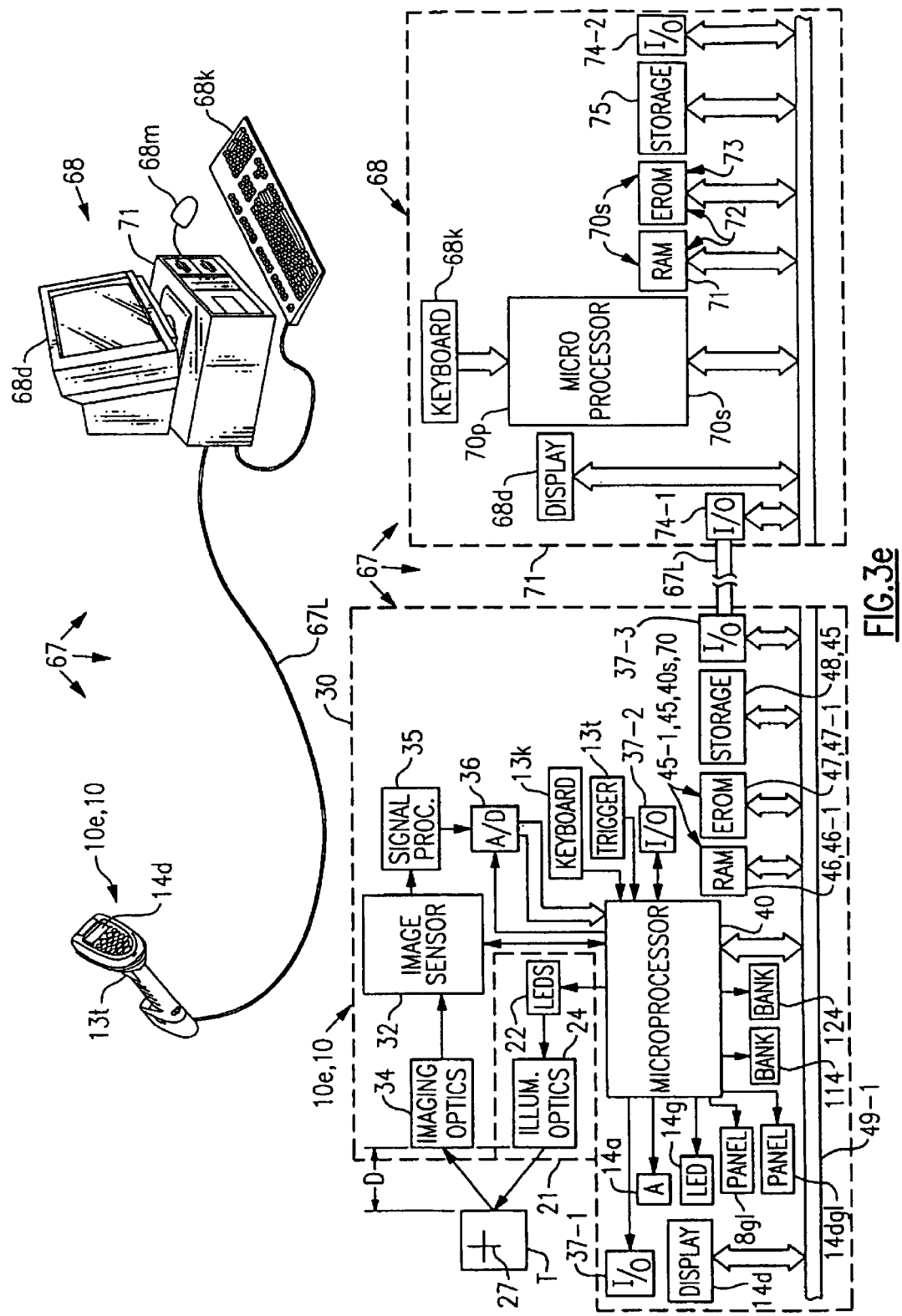

The optical reader communication system of FIG. 3e has a physical layout identical to optical reader 10d, but is optimized for a different operation. System 67 is a communication system in which optical reader processor system 40 communicates with a non-integrated local host processor assembly 68 provided by a personal computer 68 having a PC housing 71, a processor system 70s, a storage device 75 (e.g. hard drive), a keyboard 68k, a mouse 68m, and a display 68d. Provided that link 67L is a high speed communication link, non-integrated local host processor system 70s could be programmed to provide functioning identical to processor system 40s of optical reader 1d. However, because optical reader 10e comprises an integrated processor system 40 such programming is normally unnecessary, although as described in copending application Ser. No. 09/385,597, incorporated by reference herein it is useful to configure processor system 40 communication with a host processor system e.g. 70s so that certain components of optical reader 10 such as trigger 13t can be controlled remotely by host processor system 70s, which in one embodiment is non-integrated. Accordingly, in imaging device-host communication systems as shown in FIG. 3e non-integrated host processor assembly 68 typically is programmed to provide functions separate from those of the optical reader processor systems described in connection with FIGS. 3a–3d.

As described in U.S. Pat. No. 5,965,863, incorporated herein by reference, one function typically provided by non-integrated local host processor system 70s is to create operating programs for downloading into optical reader 10. Processor system 70s typically has an operating system incorporated therein, such as WINDOWS, which enables an operator to develop operating programs using a graphical user interface, which may be operated with use of a pointer controller 68m. Non-integrated local processor system 70s also can be configured to receive messages and/or image data from more than one imaging device, possibly in a keyboard wedge configuration as described in U.S. Pat. No. 6,161,760, incorporated herein by reference. It is also convenient to employ processor system 70 for data processing. For example a spreadsheet program can be incorporated in system 70s which is useful for analyzing data messages from optical reader 10e. An image processing application can be loaded into system 70s which is useful for editing, storing, or viewing electronic images received from optical reader 10e. It is also convenient to configure optical reader 10e to coordinate communication of data to and from a remote processor assembly such as assembly 88-1. Accordingly processor assembly 68 typically includes I/O interface 74-2 which facilitates remote communication with a remote processor assembly, e.g. assembly 88-1 as shown in FIG. 3c.

Referring to further aspects of reader trigger 13t, the triggers of optical readers have traditionally been employed solely for use in actuating scanning. In the present invention, the control circuit 40 configured by an operating program determines the trigger's response. A list of trigger functions may be selected from a system menu, which can be accessed by simultaneously pressing and holding the keys FUNCTION+BACK+ENTER. The actuation of alternative trigger functions and the disabling of the scanning mode can be realized in a number of ways including, but not limited to the pressing of a key or combination of keys on the keyboard 13k, selecting a user defined mode from the system menu or by pulling and holding the trigger for a predetermined amount of time.

In one aspect of the invention, the trigger 13t is used in an alpha cycling mode. In order to cycle through and select alpha characters on a traditional reader's keyboard, one hand must depress a function key such as shift or control while the other hand presses an alphanumeric key. In one embodiment of the present invention, the reader 10 can be configured so that depressing an alphanumeric key deactivates the scanning function normally provided by a trigger and causes the trigger 13t to operate in accordance with an alpha cycling function. The alpha cycling function is accomplished by pulling the trigger 13t with one hand while simultaneously depressing a numeric key with the other hand. When the trigger 13t is pulled while an alphanumeric key is depressed, the letters assigned to that key appear on the display 14d. Pulling and releasing the trigger 13t cycles through the candidate characters assigned to that key. Reader 10 can be configured so that a next character out of sequence of candidate character is displayed, either when (1) the trigger's state is changed (that is changed from a pulled to released or released to pulled state) or (2) cycled (changed from a pulled to a released and back to a pulled state or alternatively, changed from a released to pulled state and then back to a released state). When the desired character is highlighted and the key is released, the current character selection is accepted and the cursor advances. This embodiment reduces the number of keys and keystrokes required for selecting characters and it also minimizes the number of keys on the keyboard making the user interface simpler and easier to use.

In order to better illustrate the concept of a multifunction trigger 13*t*, a specific example will be considered. There are three standards for attaching identifiers to bar code data that indicates how the data is to be used. They are in descending priority, Data Identifiers (DIs), Application Identifiers (AIs), and Text Element Identifiers (TEIs). An example of DI is "11P", which identifies that the bar code is a Common Language Equipment Identifier (CLEC) code assigned by a manufacturer to telecommunications equipment. The actual data encoded in the bar code might take the form "11P1234567890," for example. If the bar code data is unreadable, the user would manually key in the entire string, including the single alpha character.

Figure 16M:
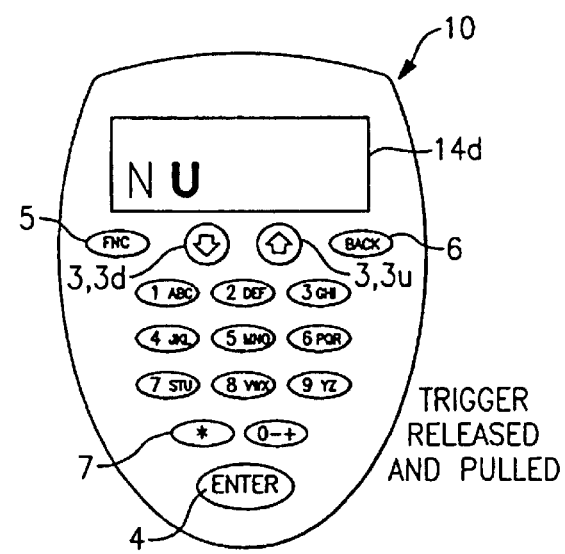
FIGS. 16a–16m are a series of reader keyboard schematic diagrams illustrating an alpha-cycling feature according to the invention.
Figure 16A:
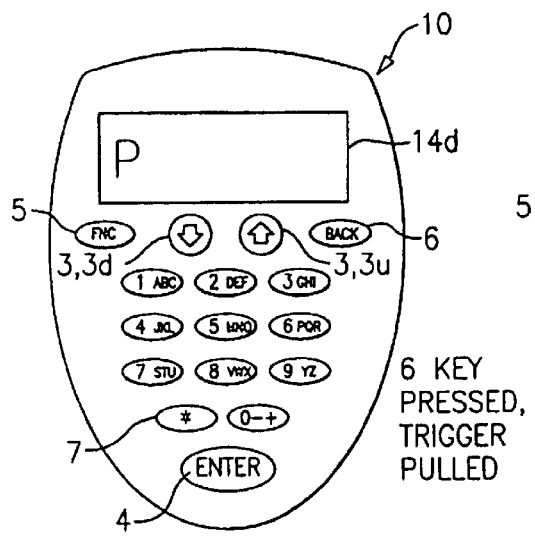
Figure 16B:
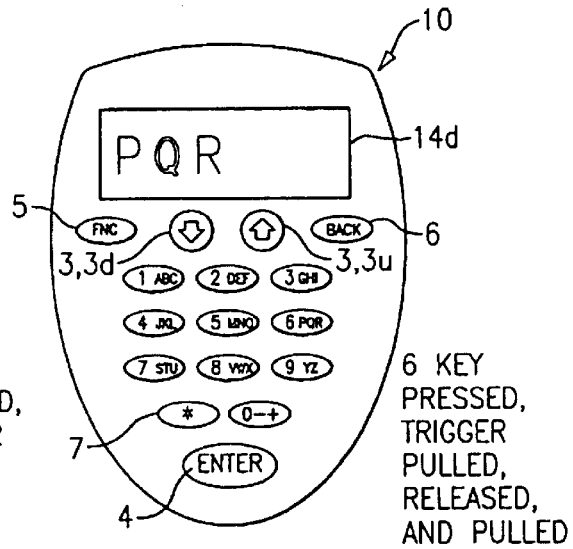
Figure 16C:
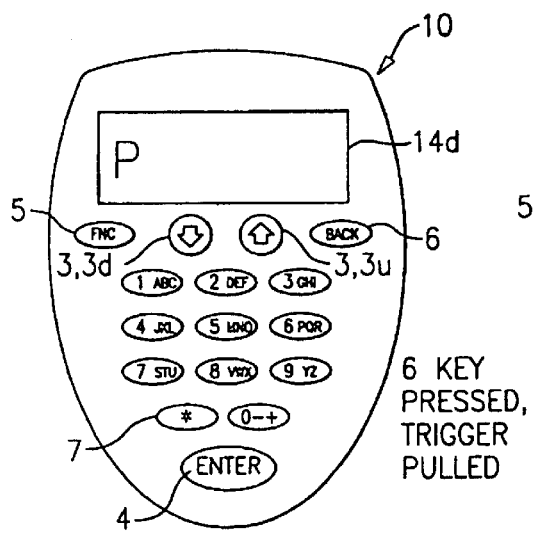
Figure 16D:
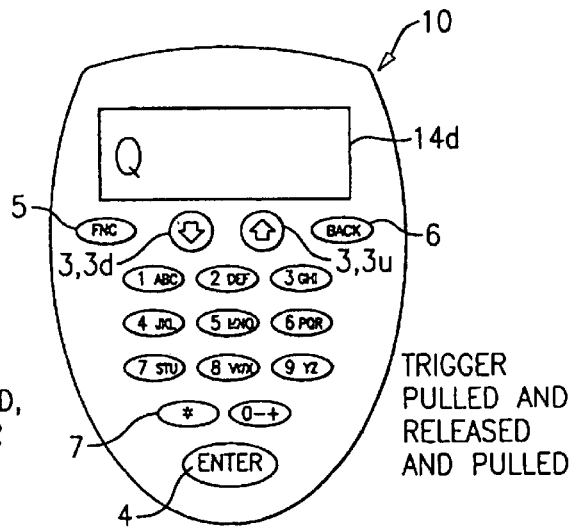
Figure 16E:
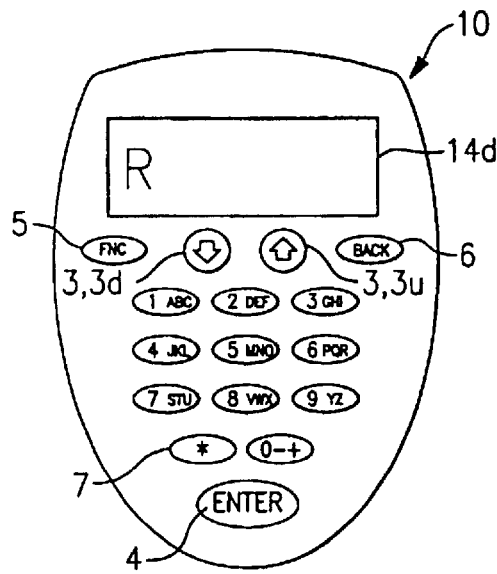

With traditional or prior art readers, "11P1234567890" would be entered by pressing 1, 1, FNC key, P, FNC key, 1, 2, 3, 4, 5, 6, 7, 8, 9, and 0 for a total of 15 key presses. This is an inefficient and time consuming way to enter data. According to the present invention the data would be entered by pressing 1, 1, followed by depressing and holding the 6 key (the key with the letters P, Q, R assigned to it) while simultaneously pulling the trigger 13*t* which causes the letter P to appear on the display 14*d* as shown in FIG. 16*a*. The reader 10 may be configured to display characters one at a time or in groups as shown in FIG. 16*b*. Pulling and releasing the trigger 13*t* sequentially cycles through the characters assigned to the 6 key as shown in FIGS. 16*c*–16*e*. When the letter P or any other desired character is highlighted on the display 14*d* and the 6 key is released the character is selected.

Figure 16F:
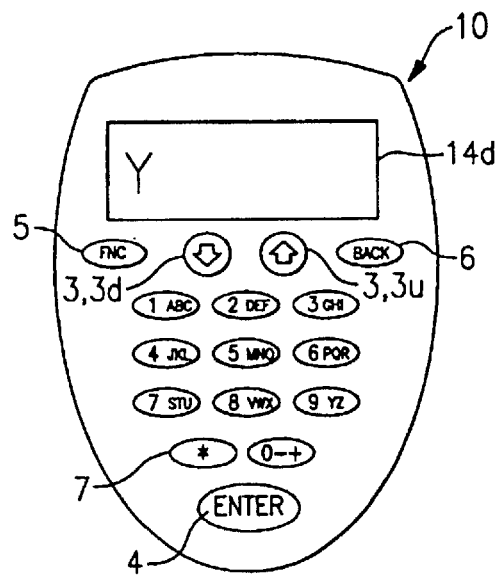
Figure 16G:
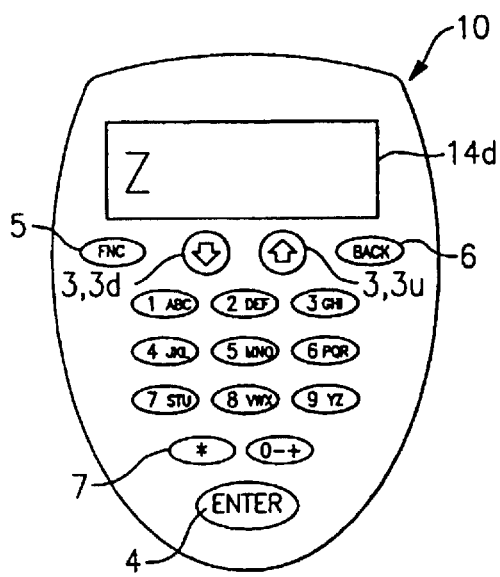
Figure 16H:
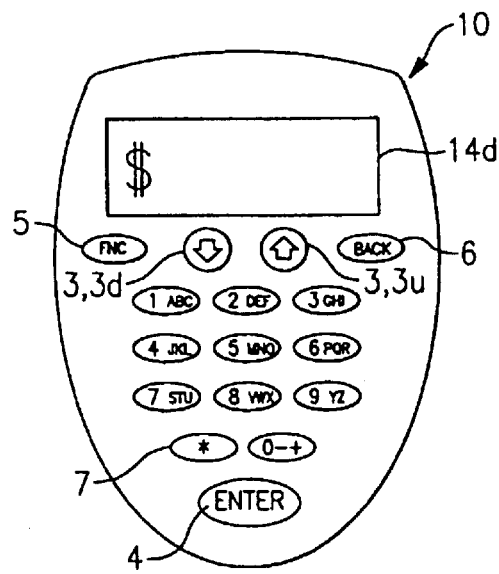
Figure 16I:
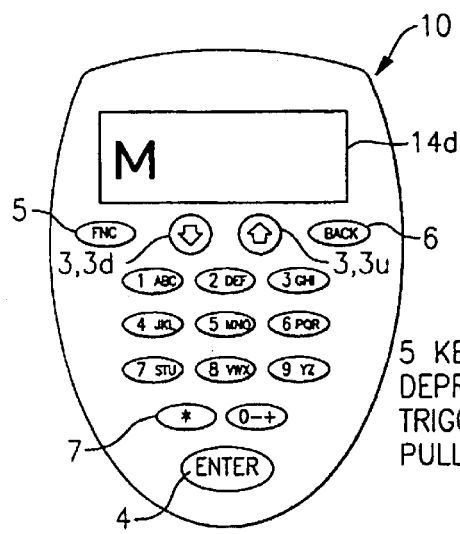

A number of different methods can be employed to "highlight" a character which will be selected by a subsequent key release. For example, a character can be highlighted by not displaying other candidate characters on display 14*d* in proximity with the highlighted character. A character can also be highlighted by displaying the character in a different font, style (bold, italic, flashing, light on dark background) color or size relative to other displayed characters (such as other candidate characters as shown in example 16*b*, or previously selected characters as shown in FIGS. 16*k*, 16*c*, and 16*m*). In the example of FIG. 5*b* the character Q is highlighted relative to the characters P and R in that it is displayed in bold font. In the example of FIGS. 5*j*, 5*k*, and 5L, candidate characters are highlighted in that they are displayed in bold font relative to previously selected characters.

In the particular example described with reference to FIGS. 16*a*–16*e* control circuit 40 is configured so that when the 6 key has been depressed for a predetermined amount of time the scanning activate function of trigger 13*t* is disabled. Pulling trigger 13*t* when the 6 key is depressed causes candidate character P to be displayed and highlighted on display 14*d*. Releasing the 6 key accepts (selects) the letter P and returns the trigger 13*t* to its scanning function. The numbers 1, 2, 3, 4, 5, 6, 7, 8, 9, and 0 would then be entered by pressing the appropriate keys. This method requires only 13 key presses to enter the data and it eliminates the need for an additional function key to access alpha characters.

In another example, the "$" character would be entered by pushing and holding the 9 key (the 9 key accesses Y, Z, $) while pulling and releasing the trigger 13*t* to cycle through the Y and Z characters until reaching the "$" character. See FIGS. 16*f*–16*h*. Releasing the 9 key selects the "$" character.

Figure 16J:
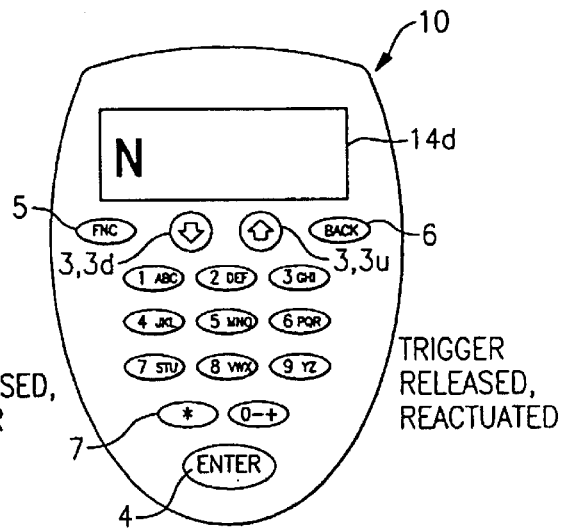
Figure 16K:
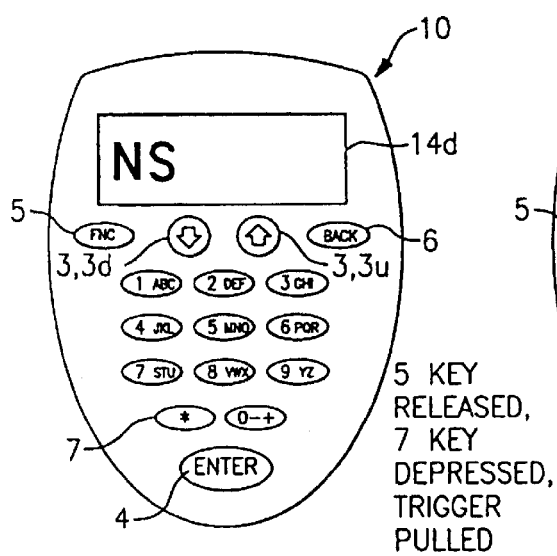

In another example, the characters N and U can be selected by first pushing and holding the 5 key (the 5 key accesses M, N, O) while pulling and releasing the trigger 13*t* to cycle through the M character until reaching the N character (FIG. 16*j*). Releasing the 5 key results in the highlighted character being selected for display or output.

Figure 16L:
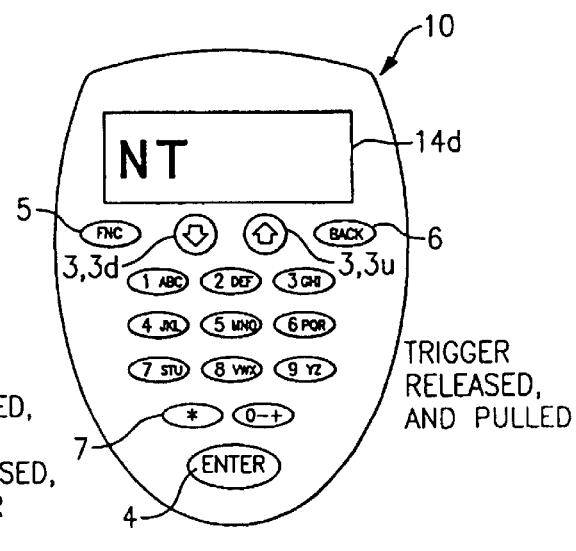

Referring to FIG. 16*k*, the 7 key can then be depressed while trigger 13*t* is pulled to call up the candidate sequence of characters "S," "T," and "U." As indicated in FIG. 16*k*, reader 10 may be configured so that the S character is displayed when the 7 key is first depressed with trigger 13*t* being pulled. Trigger 13*t* can then be released and pulled again to display in a highlighted display format the T candidate character as indicated in FIG. 16L, and then released and pulled again to display the U candidate character as shown in FIG. 16*m*. Releasing and pulling trigger 13*t* would result in the S candidate character being displayed again. Releasing the 7 key when the U character is displayed results in the U character being selected for display or output.

In another embodiment of the invention, the trigger 13*t* may be configured by the control circuit 40 to activate a macro function, a list of commands, or keystrokes similar to a simple program or batch file that is initiated with a single command, keystroke or trigger pull. When a macro is activated its contents are shown on the display. Macros can save the user a great deal of time and effort and are particularly useful for entering repetitive keystroke intensive data such as addresses, warehouse locations, product codes or any other similarly useful information.

To further illustrate this concept of a trigger initiated macro function consider an example in which the user may need to scan a variety of products with different data entry requirements. Some items may require specialized product location or category information entered before the item is scanned.

Consider the example of a particular item requiring a generic product code, a warehouse address and a bin location. This information would normally entail a burdensome number of individual keystrokes because the data would have to be manually entered. With a trigger activated macro the information would automatically be input with a single pull of the trigger 13*t*.

In another embodiment of the invention, the trigger 13*t* may be configured to scroll through and select text or graphical information shown on the display 14*d*. Pulling the trigger 13*t* would advance and highlight one selection after another. The user may wish, for example, to select an item from a list of scanned items, graphical icons, warehouse locations or product categories shown on the display 14*d*. The trigger 13*t* when actuated in the scrolling mode would scroll through the list and highlight individual items. When the desired item is highlighted, the user may select the item in a number of ways including pressing a key or releasing the trigger 13*t*.

Reader 10 can be configured so that the scrolling function proceeds at a user-defined rate and in a number of user-defined ways such as vertical, horizontal, character by character, or pixel by pixel.

In another embodiment of the invention the trigger 13*t* may be configured to change or adjust values shown on the display 14*d*. Such values may include, for example, values that represent the volume level associated with an audio feedback key press, the brightness and contrast level of the display, or a quantity of scanned items. When the relevant numerical or graphical information is shown on the display 14*d* the trigger can adjust the values in a number of ways including pulling and holding the trigger 13*t* to move in a continuous fashion or pulling and releasing the trigger 13*t* to advance in an incremental manner.

The trigger 13*t* may also be configured by the control circuit 40 to take on additional functions including but not limited to the shift, control, backspace, function, or enter keys. The benefits in time and effort of allowing the user to access the above mentioned functions without removing a hand from the trigger 13*t* are substantial. The user might wish to view the system menu which is normally activated by simultaneously pressing the FUNCTION+BACK+ENTER keys. With the trigger 13*t* configured to respond as one of the function keys the menu could now be accessed by using the trigger 13*t* and only two function keys.

Adjusting the contrast controls can illustrate another example of using the trigger 13*t* as one of the keyboard function keys. Contrast controls are normally accessed by depressing the FNC key 5 followed by pressing one of the soft keys 3 wherein the down key will darken the display 14*d* and the up key will lighten the display 14*d*. With the trigger 13*t* configured as the function key, the user will need only to pull the trigger 13*t* with one hand and depress a soft key with the other hand to adjust the contrast.

Contrast control is normally accessed by using the FNC5 and soft keys 3. As previously discussed it is possible to configure the trigger 13*t* to perform the function of FNC key 5. Once this alternative configuration is selected, and the trigger 13*t* is configured as the FNC key 5, the user would then pull the trigger 13*t* initiating the FNC key 5 function. Contrast values would then be adjusted by pulling the trigger 13*t* when the trigger 13*t* is configured in the value adjustment mode. Actuating the trigger 13*t* in this mode changes the contrast value shown on the display 14*d*. Hence, the contrast has been adjusted using only the trigger 13*t* in two different modes.

The trigger 13*t* can also be configured to access macros programmed into the alphanumeric keys. These macros are traditionally activated by pressing one of the function keys followed by the desired alphanumeric key. The ability to access functions with the trigger 13*t* makes it possible to activate the desired macro by pulling and holding the trigger 13*t* and pressing the desired alphanumeric key. The user may wish for example, to access a macro programmed into the 8 key. Pulling the trigger while it is configured as a function key and then depressing the 8 key would initiate the macro. Having the trigger 13*t* configured in this manner allows macro activation using fewer keys.

In a similar manner the trigger 13*t* may also be configured to access characters and functions that have been reassigned to alphanumeric keys for specialized purposes. The six key, for example, could be programmed to display the system menu when depressed in conjunction with a function key.

With the trigger 13*t* configured as a function key, the system menu could be displayed by actuating the trigger 13*t* while simultaneously pressing the six key. In another example, the three key may be programmed to input the number 100 when it is depressed in conjunction with a function key. With the trigger configured as a function key, the number 100 would be input by actuating the trigger 13*t* and pressing the three key. Many potential variations and uses of this embodiment are clear to one having ordinary skill in the art.

The trigger 13*t* may also be configured to simultaneously take on more than one function at a time. In such a configuration, the differentiation of functions could be determined by how long the trigger 13*t* was pulled. The required time would be specified by the user. An ENTER function for example, could be initiated by pulling and holding the trigger for two seconds while a BACK function could be initiated by pulling and holding the trigger for four seconds, etc. This configuration would allow the user to access a number of keystroke intensive functions with even fewer keys.

The previously mentioned system menu which normally requires the simultaneous pressing of the FUNCTION+BACK+ENTER keys could under this embodiment be accessed by using the trigger 13*t* and only one other function key.

The trigger functions of this embodiment could be configured by the control circuit 40 to respond as though they were simultaneously actuated even though they were sequentially activated. This could be accomplished by defining a certain time period in which the trigger actuated functions would all have to be performed. All trigger functions, for example, that were initiated within six seconds would be considered by the system to be concurrent. This would allow the user to activate functions requiring multiple, simultaneous key presses using only the trigger 13*t*. The trigger 13*t* could also be configured so that the differentiation of functions would be dependent upon the degree of actuation. In other words, how far the trigger 13*t* is actually squeezed. Pulling the trigger 13*t* half way for example, could initiate the FNC function while pulling the trigger 13*t* all the way would initiate the BACK function. To access the backlight controls in a traditional manner, the user would press the FNC key 5 followed by the BACK key 6. With the trigger 13*t* configured in this embodiment the user could access the backlight controls using only the trigger 13*t*. The user would pull the trigger half way to initiate the FNC function then release it followed by pulling the trigger all the way to initiate the BACK function. This process would access the backlight controls using only the trigger 13*t*.

Figures 1D, 4A:
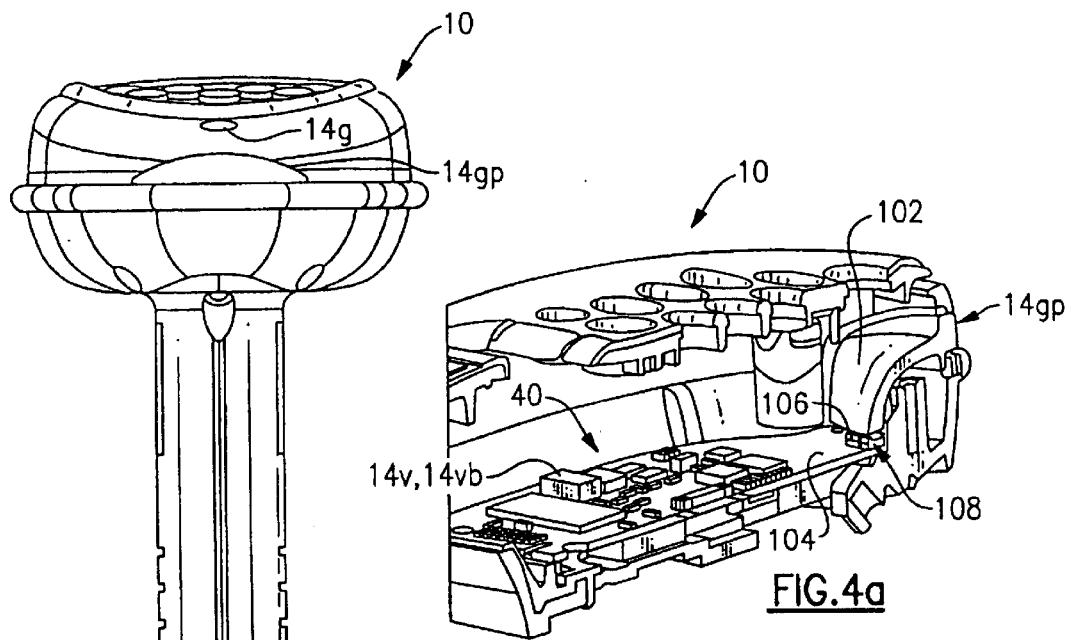
Figure 4B:
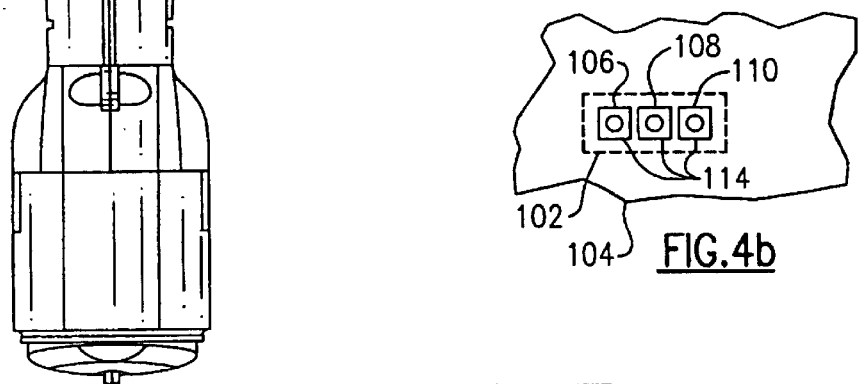
FIG. 4b is a top view of a main circuit board of an optical reader illustrating a bank of LEDs for illuminating a panel status indicator of the invention.

Referring to status-indicating features of the invention in greater detail, good read indicator panel 14GP comprising an enlarged surface area visible to an operator is explained further with reference to the cutaway reader internal perspective view of FIG. 4*a*, and to the top circuit board view of FIG. 4*b*. In the embodiment of FIGS. 4*a* and 4*b*, good read indicator 14GP comprises a light pipe 102 which conducts light from light sources disposed within reader 10 to the exterior surface of reader 10 so that the light is visible to an operator. The light exit surface of light pipe 102 constitutes the portion of indicator 14GP which is visible to an operator. Light pipe 102 in the specific embodiment described, conducts light from three surface mount LEDs 106, 108, and 110 which are mounted on a reader main circuit board 104. LEDs 106, 108, and 110 may comprise different colored light sources. In one embodiment LED 106 is a red light LED, LED 108 is a yellow light LED, and LED 110 is a green light LED. While a decoding attempt is in process, control circuit 40 activates yellow light LED 108 to indicate to an operator that decoding is in process. If decoding fails, control circuit 40 operates red light LED 106 to indicate that decoding has failed. If decoding is successful, control circuit 40 operates green LED 110 to indicate that decoding is successful. The red, green, and yellow colors of emission are selected to correspond to the traditional stop/go/warning indicating colors of a traffic light. Therefore, an operator's prior experience with indicators indicating red, green, and yellow colors reinforces the meaning of the indication given by the particularly selected emission characteristics of LEDs 106, 108, and 110. LED bank 114 of light panel 14GP could also comprise leaded LEDs, surface integrated LEDs, and may comprise as few as a single LED. LED bank 114 could also comprise two LEDs, a red light LED, and a green light LED, wherein the red and green LEDs are activated simultaneously during a decoding attempt to emit yellow light during a decoding attempt using red and green light LEDs. The current driving signals presented the pair of LEDs could be reduced during the yellow light emission condition so that emitted yellow light is not brighter substantially than either of the red emitted light or green emitted light.

While in the specific example described with reference to FIGS. 4a and 4b, good read indicating panel 14GP is provided by a light pipe which conducts light from light sources mounted to a main reader circuit board 102 good read indicating panel 14GP could also be produced by a translucent window defining a part of the reader housing exterior in combination with one or more LED light sources mounted directly behind a window in proximity with the window.

Turning now to FIGS. 4c–4f, keyboard associated good read indicator 14GK is described in greater detail. In one embodiment, keyboard associated good read indicator 14GK includes a translucent key 120 disposed above a light source bank 124 comprising at least one light source. In the embodiment shown in FIGS. 4c and 4d, bank 124 is a LED bank including three surface mount LEDs 126, 128, and 130 surface mounted on keyboard printed circuit board 132. LED 126 is a red light LED, LED 128 is a yellow light LED, and LED 130 is a green light LED. Control circuit 40 may operate light source bank 124 in the manner described previously in connection with light source bank 114 of panel good read indicator 14GP. That is, control circuit 40 may activate yellow LED 128 during a decoding attempt to indicate to an operator that decoding is in process. If decoding fails, control circuit 40 may operate red LED 126 to indicate that decoding has failed. If decoding is successful, control circuit 40 operates green LED 130 to indicate that decoding successful. The red, green, and yellow colors of emission are selected to correspond to the traditional stop/go/warning indicating colors of a traffic light. Therefore, an operator's prior experience with indicators indicating red, green, and yellow light reinforces the meaning of the color indicator indication given by LEDs 126, 128, and 130. LED bank 124 of key-associated indicator 14GK could also comprise leaded LEDs or other types of light sources such as surface integrated LEDs. LED bank 124 could also comprise two LEDs, a red LED, and a green LED wherein the two red and green LEDs are activated simultaneously during a decoding attempt to emit yellow light during a decoding attempt. The current driving signals presented to the pair of LEDs could be reduced during the yellow light emission condition so that emitted yellow light is not substantially brighter than either of the red emitted light or green emitted light.

In a further aspect of the invention, key-associated good read indicator 14GK is incorporated in a key larger than remaining e.g. keys 5, 6, and 7 of keyboard 13k. This makes good read indicating key 4 stand out relative to remaining keys of keyboard 13k, and allows good read key 4 to accommodate larger and a larger number of light sources. In a further aspect, key-associated good read indicator 14GK is incorporated in a key that is positioned the most rearward, or substantially the most rearward on keyboard 13k. Positioning key-associated good read indicator 14GK toward rear 9 of keyboard 13k positions indicator 14GK in a position where it is in the closest possible position in relation to an operator's eyes during normal operating conditions.

In a still further aspect of the invention, control circuit 40 is configured to display messages on display 14d when an operator presses key-associated good read indicator 14GK. Preferably, control circuit 40 is configured so that the messages displayed by display 14d when key 14GK is depressed depend on the status condition presently being indicated by key 14GK when key is depressed and include information related to the mode of operation that reader is currently operating in. For example, if key 14GK is depressed when key 14GK is red (indicating a decode fail), control circuit 40 may display information relating to the reason for the decoding fail and or messages providing instructions as to how the condition may be corrected. For example, reader 10 may incorporate standardly known verifier software and may display a message such as "SYMBOL SUBSTANTIALLY DEGRADED" during a decode fail mode. In the alternative, control circuit 40 may display on display 14d message indicating the types of symbology decoding algorithms currently enabled by reader 10 so that operators can observe whether the symbol that the operator is presently attempting to decode is of a symbol type which the reader is presently equipped to decode. Methods for enabling and disabling symbology decoding algorithms are described in further detail in U.S. Pat. No. 5,965,863, filed Apr. 23, 1997, entitled "Optical Reader System Comprising Local Host Processor and Optical Reader," incorporated herein by reference. In the case that indicator 14GK is green to indicate a successful read and key 14GK is depressed, control circuit 14 may display a message on display 14d detailing information respecting the successful read, including such information as the decoded out message and the symbology type.

In still further aspect of the invention, the key indicator message display feature is incorporated in association with an ENTER key (or equivalent in an alternative foreign language), and control circuit 40 is configured to display messages when ENTER key 4 is depressed. Keyboard equipped computers, such as PC's are commonly configured so that new informational messages are called up a display when a keyboard ENTER key is depressed. Therefore, incorporating a display message feature of the invention in association with an ENTER key takes advantage of an operator's prior experience in using ENTER keys of computer keyboards. Providing key-associated indicator 14GK in association with an enter key provides graphical reinforcement, in a permanent graphic, for the indicator-key display message feature of the invention. More particularly, providing the display message feature of the invention in association with an ENTER key reminds an operator that the display message feature is available and also provides a reminder to the operator, in permanent graphic, as to how the feature may be activated.

Figure 4C:
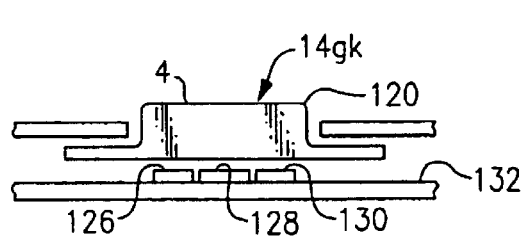
FIG. 4c is a side view of a status indicating translucent keyboard view of the invention.
Figure 4D:
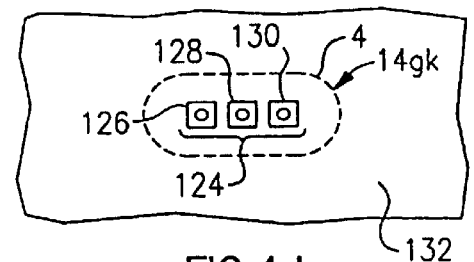
FIG. 4d is a top view of a keyboard circuit board incorporating a bank of LEDs for illuminating a status indicating key.

An alternative embodiment of a translucent key feature of the invention is described with reference to FIGS. 4e and 4f. In the alternative embodiment of FIGS. 4e and 4f, it is seen that keyboard associated LEDs, e.g. LED 128 are well-mounted in hole 132h of PCB 132 so that LEDs 124 do not substantially intersect the plane of the top surface of keyboard PCB 132. This design eliminates the need to provide a designed-in clearance in key 4 to accommodate back mounted LEDs 124 as are shown in FIGS. 4c and 4d. Referring to further aspects of the design of FIGS. 4e and 4f, LEDs may be mounted to PCB 132 by soldering LEDs 124 to circuit tracings formed on bottom 132b of board 132. The soldering of LEDs 124 to board 132 provides electrical connection and mechanical support for LEDs 124. A standard keyboard key is shown in FIG. 4k. In FIG. 4k, it is seen that key 3 comprises a single contact post 3p and PCB 132 in the area under post 3p comprises a single contact pad 132p. In the embodiment of FIG. 4L, which may be utilized in connection with the embodiments shown in FIGS. 4c, 4d, 4e, and 4f, translucent key 4 can comprise a pair of spaced apart contact posts 4p and circuit board 132 can comprise a pair of spaced apart contact pads 132p, so that posts 4p do not interfere with the emission of light through the center of key 4. Referring to further aspects of the design of FIGS. 4e and 4f, support 131 in the embodiment of FIGS. 4e and 4f physically supports PCB 132 and keyboard 13K against housing 11.

In a further aspect of the invention, in one embodiment, control circuit 40 operates panel good read indicator 14GP at rear of head 8 and key-associated indicator 14GK at top of head 8 simultaneously and redundantly. That is, after a successful read, control circuit 40 operates both indicator 14GP and indicator 14GK so that both indicators emit green light. In the case of an unsuccessful read, control circuit 40 operates both of indicators 14GK and 14GK to emit red light. In the case that decoding is in process, control circuit operates both of indicator 14GK and indicator 14GP to emit yellow light. Providing a first good read indicator 14GP substantially at rear of reader head 8 and a second good read indicator 14GK substantially at a top of head 8 provides a reader head having good read indicators that are most visible at both extremes of what can be considered normal operating viewing positions during use of reader 10. A first extreme of a normal operating viewing position can be considered the viewing position, wherein reader 10 appears to an operator as shown in FIG. 1d and a second extreme of a normal operating viewing positions can be considered the position at which reader 10 appears to an operator as shown in Fig. c.

Referring now to additional status condition indicating features which may be incorporated in reader 10, display 14d of reader 10 can incorporate a light source 14DSL, which may be controlled by control circuit 40 to indicate a status condition of reader 10 such as a decoding status of reader 10.

Figure 4G:
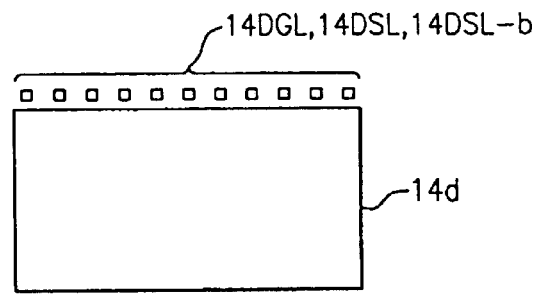
FIG. 4g is a top view of a lighted display according to the invention.
Figure 4H:
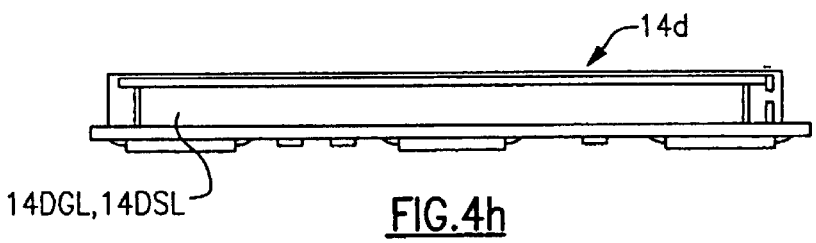
FIG. 4h is a side view of an alternative lighted display according to the invention.
Figure 4I:
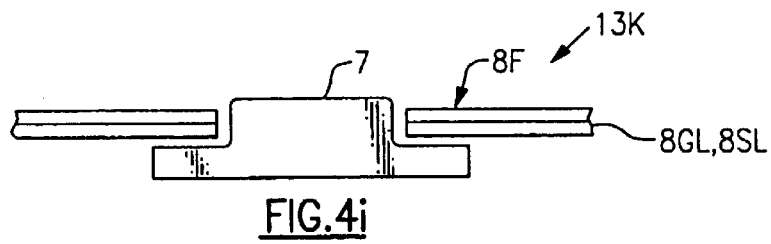
FIG. 4i is a side view of a translucent illustrated face plate according to the invention.
Figure 4J:
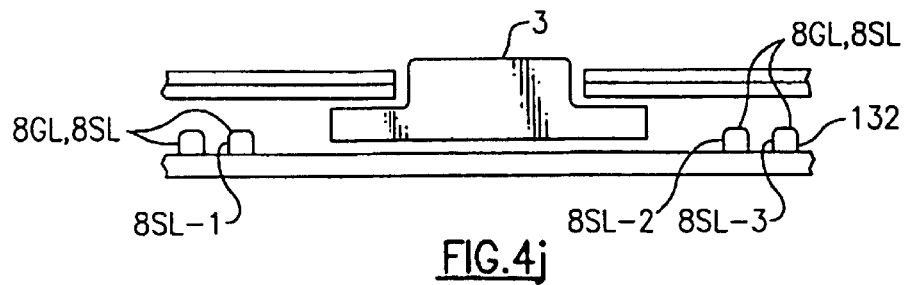
FIG. 4j is a side view of an alternative translucent illuminated face plate according to the invention.
Figure 4E:
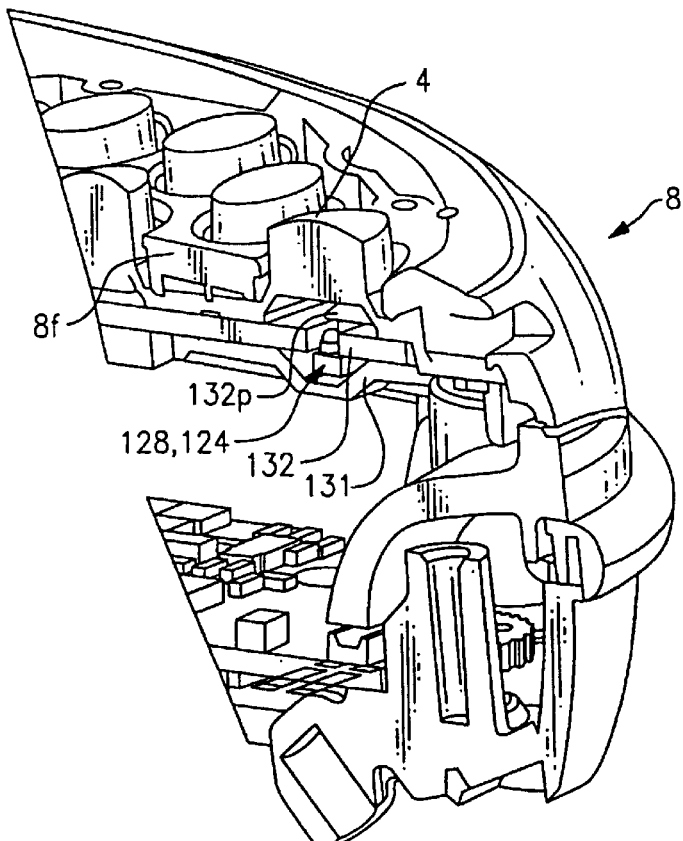
FIG. 4e is an interior perspective view of an optical reader illustrating an alternative status indicating translucent key according to the invention.
Figure 4K:
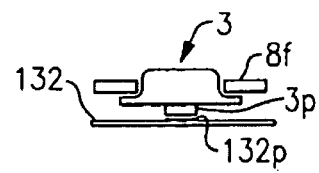
FIG. 4k is a side view of an exemplary keyboard key assembly according to the prior art.
Figure 4L:
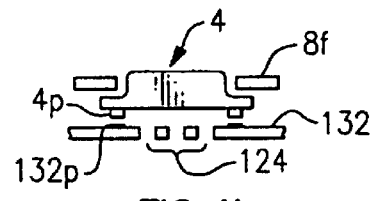
FIG. 4l is a side view of an exemplary keyboard key assembly in accordance with an aspect of the invention.
Figure 4F:
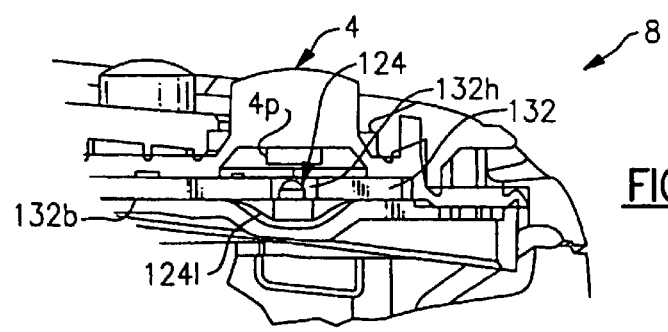
FIG. 4f is a side view of the translucent key shown in FIG. 4e.

Referring to FIG. 4e display 14d may include a display associated light source 14DSL, which is shown in FIG. 4g as a panel 14DSL-a for backlighting display 14d. Light source 14DSL which may be, for example, an electroluminescent (EL) panel or a diffuser is associated with a cold cathode flourescent lamp (CCFL) (not shown) operates to backlight display 14d. Light source 14DSL associated with display 14d can also be provided, for example, by a series of LEDs, 14DSL-B, as is shown in FIG. 4g. The individual light sources of source 14DSL-B can be selected to emit light in different colors as will be described herein.

Control circuit 40 can also display messages on display 14d to indicate various status conditions. Still further, as shown in FIG. 4g face plate 8F of keyboard 13k can incorporate a light source 8SL. As shown in FIG. 4g light source 8SL associated with face plate 8f can include a light panel 8SL-a (such as an EL panel or CCFL-illuminated diffuser) for backlighting face plate 8f, which in the embodiment of FIG. 4g comprises a translucent material. Light source 8SL associated with face plate 8f can also be provided, for example, by a series of LEDs 8SL-B as is shown in FIG. 4j. Control circuit 40 can control face plate light source 8SL to indicate a status condition of reader 10 such as a decoding (good read) status condition.

Figure 6A:
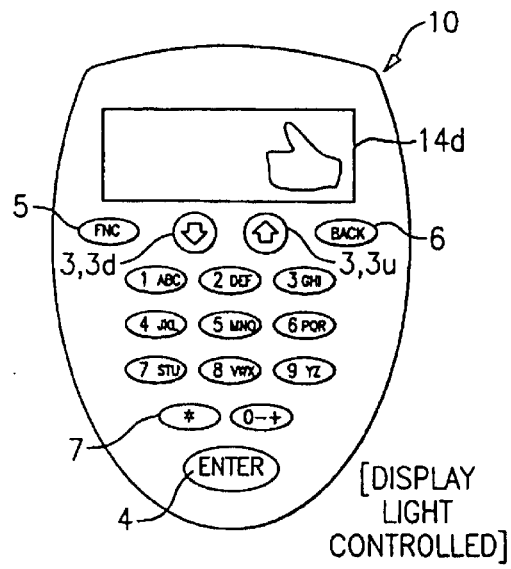
FIGS. 6a–6d are a series of reader keyboard schematic diagrams illustrating further examples of using the display backlight as a good read indicator.
Figure 6B:
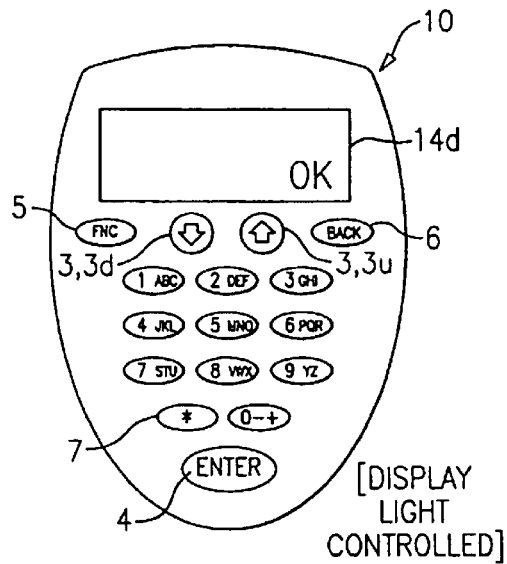
Figure 6C:
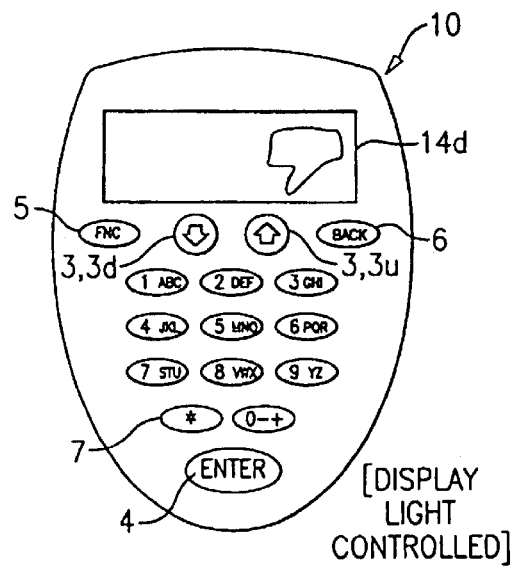
Figure 6D:
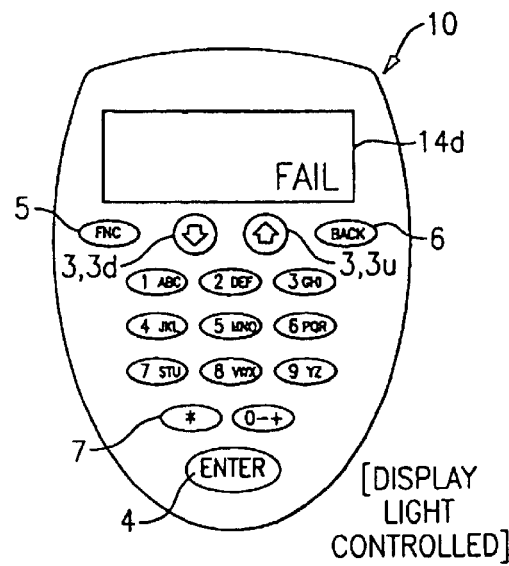

Referring to more specific features which may be incorporated in the invention, control circuit 40, in one embodiment controls display light source 14DSL in a specific manner to signal a good read or some other condition. The display light source 14DSL, for example, could be controlled by circuit 40 to pulse, flash, or blink to indicate a good read, bad read, or battery low condition. Control circuit 40 could, contemporaneously control display 14D to display messages indicating the specific conditions such messages may comprise text, graphics, or both. Exemplary text messages are shown in FIGS. 5a–5c. A graphical "THUMBS UP" or "OK," for example, may be displayed by control circuit 40 to indicate a good read as shown in FIGS. 6a and 6b and a graphical "THUMBS DOWN" or "FAIL" may be displayed by circuit 40 to indicate a bad read as shown in FIGS. 6c and 6d.

Reader 10 may be configured so that the length and duration of the pulses differentiates between various conditions. For example, a single backlight pulse may indicate a good read while a series of short backlight pulses may indicate a battery low condition. Control circuit 40 may further be configured to display messages on display 14d corresponding to and supplementing the indicator provided by control of display light source 14s1. Other conditions such as bad read, scanner out of range, or quantity and type of items scanned could also be indicated by combined control circuit control of backlight 14b and the indicia displayed on display 14d.

Figure 7A:
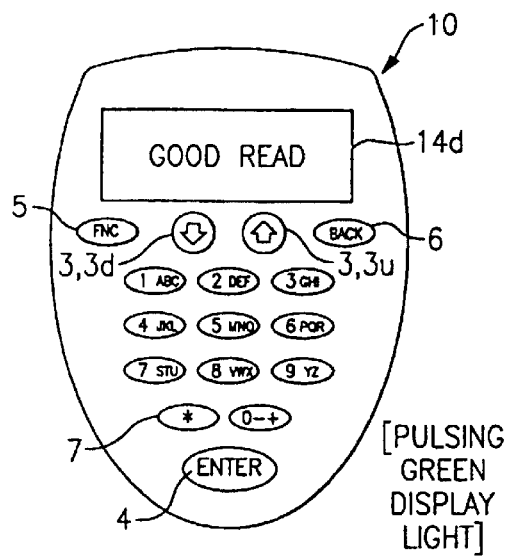
FIGS. 7a–7c are a series of reader keyboard schematic diagrams illustrating examples of using pulsing multi-colored display backlights to indicate various conditions.
Figure 7B:
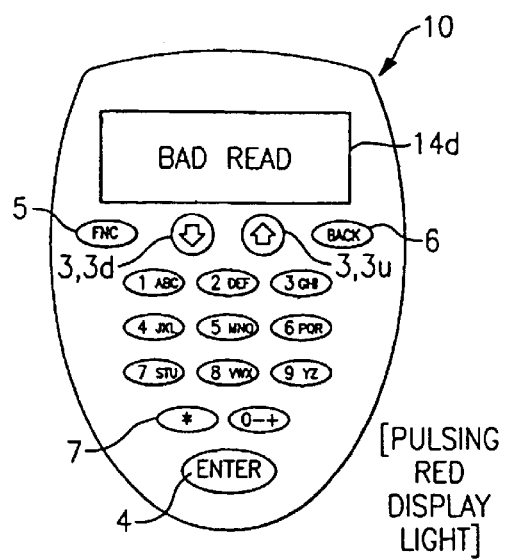
Figure 7C:
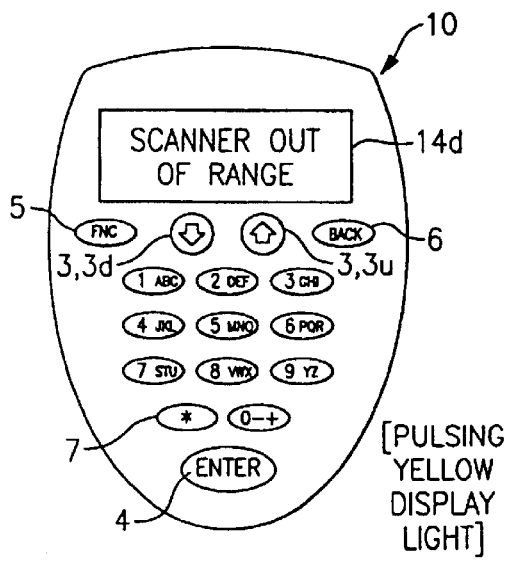

Control circuit 40 can also be configured to control display 14d so that display light source 14DSL lights up or pulses different colors to indicate various conditions such as good read, bad read, or battery low. The LEDs of the LED array shown in FIG. 4g can be selected to emit light in different colors. Each color could signify a different condition. A pulsing green display light, for example, could indicate a good read as shown in FIG. 7a. A pulsing red display light could indicate a bad read as shown in FIG. 7b while a pulsing yellow light could indicate scanner out of range as shown in FIG. 7c. Control circuit 40 can supplement the status indication provided by pulsing display light by displaying corresponding text or indicia messages verifying display 14d.

It would also be possible to configure control circuit 40 to simultaneously indicate multiple conditions using a pulsing variable color backlight. For example, controlling display light 14DSL to exit pulsing green light could indicate a good read and battery low set of conditions while controlling light source 14DSL to emit a pulsing red light could indicate a bad read and scanner out of range set of conditions. Display light source 14DSL could be controlled to indicate any number of different conditions based on these various color and pulsing schemes. The display itself could distinguish the specific conditions with text, graphics or both.

Figure 8I:
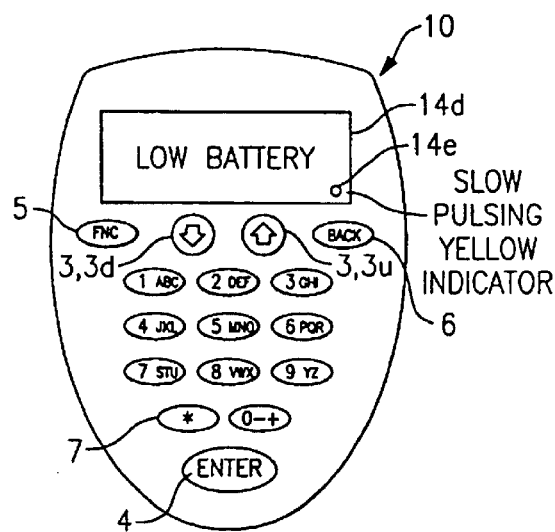
FIGS. 8a–8i are a series of reader keyboard schematic diagrams illustrating a series of examples using a good read indicator imbedded in the display to indicate a variety of different conditions.
Figure 8A:
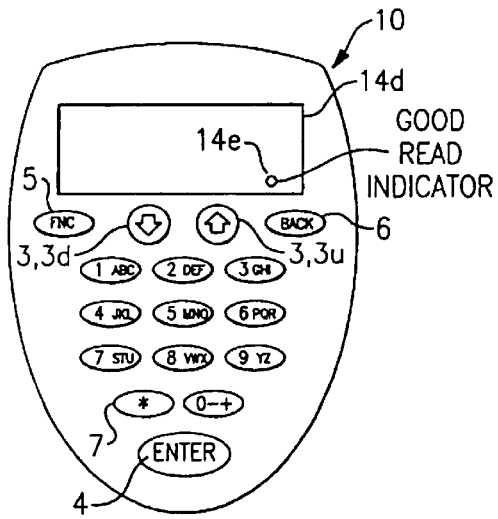
Figure 8B:
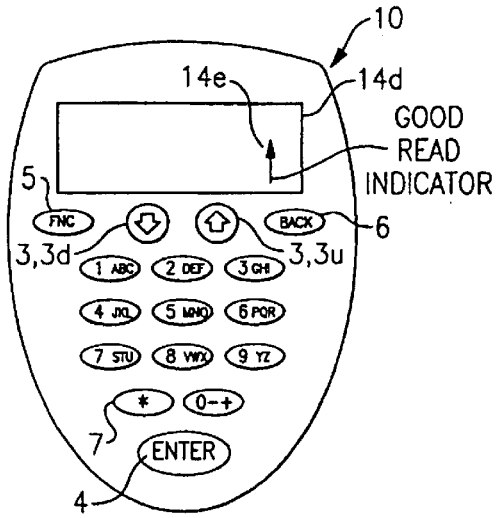

In another embodiment of the present invention it would also be possible to configure the display so that a good read indicator is embedded in the display itself as shown in FIG. 8a. The indicator 14e could appear as a small flashing dot, icon, alphanumeric character, or any other desired graphical representation as shown by arrow, for example in FIG. 8b. The indicator could be placed anywhere within the display, but it would preferably be situated near the edge or in a lower corner so as not to interfere with display content. In the case of an LCD embedded indicator 14e may comprise, for example, a selected group of crystal display elements, a group of display elements which emit light at a color different than surrounding elements, or a discreet light source such as an LED surrounded by display elements of the LCD.

Figure 8C:
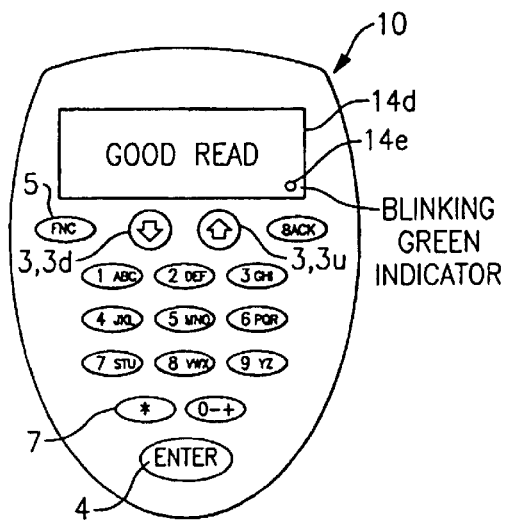
Figure 8D:
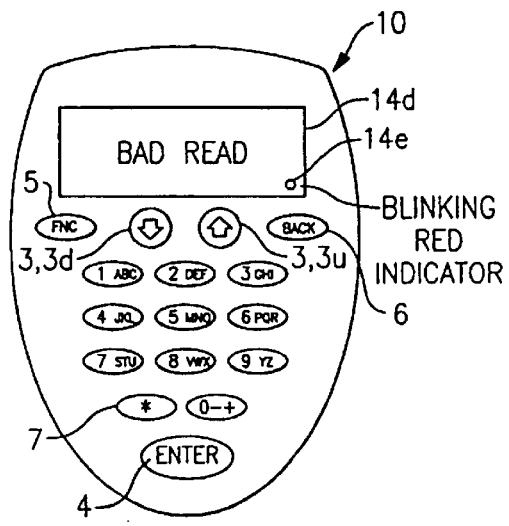
Figure 8E:
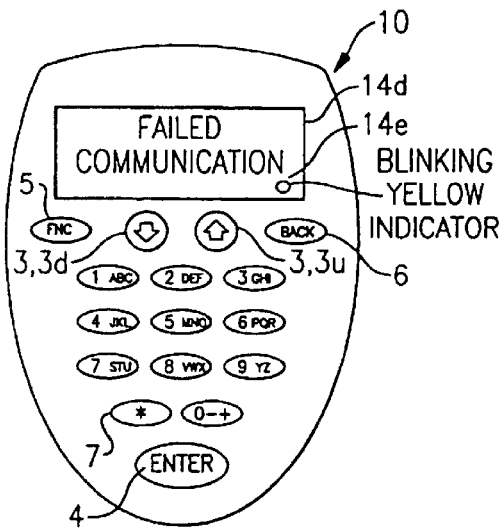

Control circuit 40 may control embedded indicator 14l to flash or pulse different colors at different rates to indicate variable conditions. A blinking green light within the display 14d, for example, could indicate a good read as shown in FIG. 8c. A blinking red light within the display could indicate a bad read as shown in FIG. 8d while a blinking yellow light within the display could indicate a decode attempt in progress condition or another status condition e.g., a failed communication condition.

Figure 9D:
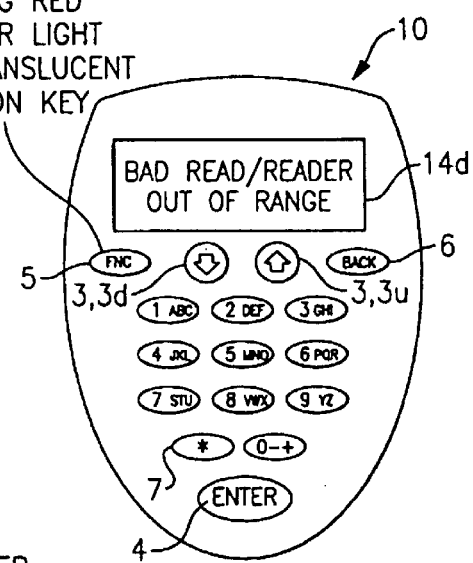
Figure 9E:
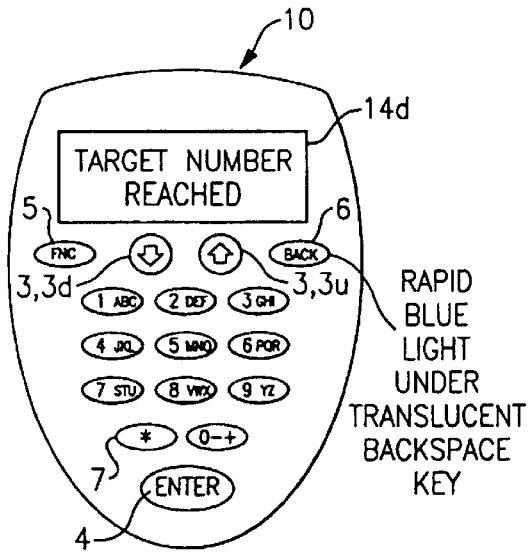

A reader according to the invention can also be made to activate an indicator or indicators to indicate that a predetermined scan result target has been achieved. A predetermined scan result target may be, for example, that a predetermined quantity of a certain article has been scanned or that a predetermined article or article type has been scanned. Referring to a particular exemplary control circuit 40 may be configured to operate a light source, e.g. 14d in a certain manner if reader 10 has successfully scanned a predetermined number of articles of a certain type, a predetermined type of article. Control circuit 40 may display on display 14d a scan result status indicating message such as "TARGET NUMBER REACHED" as indicated in FIG. 9e, to reinforce such an indication it will be seen that control circuit 40 can operate another light source, e.g. source 14DSL, 8SL, 114 and 124 to indicate a scan result status condition and may reinforce such an indication with a displayed message on display 14d.

Figure 8F:
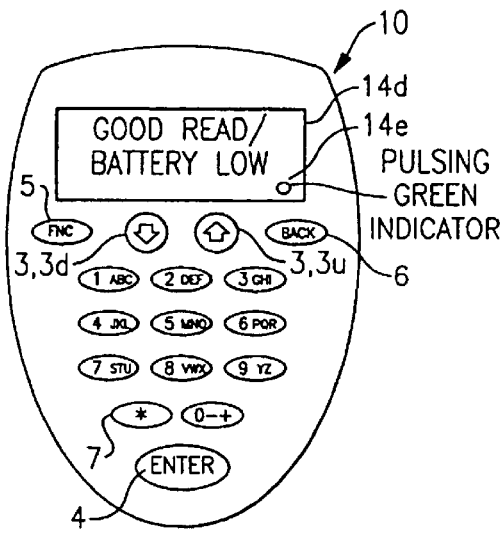
Figure 8G:
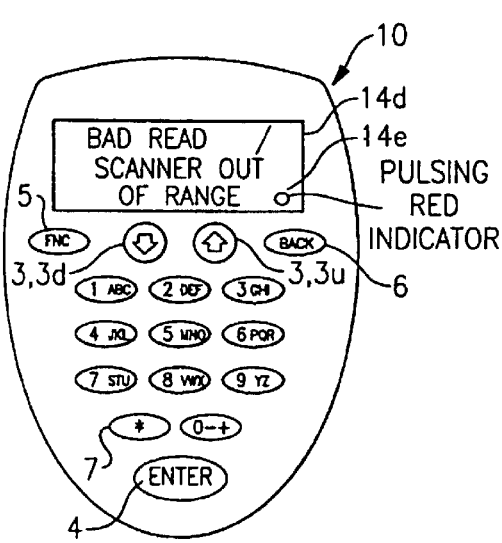
Figure 8H:
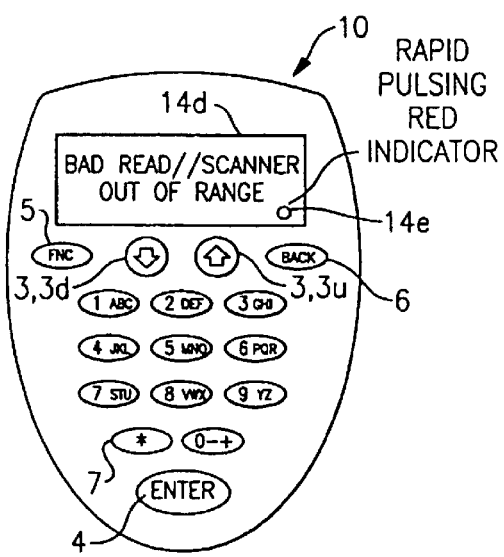

The embedded good read indicator could be configured in a number of variable color and pulse schemes to indicate different conditions. It would also be possible to configure the good read indicator in this embodiment to simultaneously indicate more than one condition. For example, a pulsing green good read indicator imbedded within the display could indicate a good read and battery low as shown in FIG. 8f while a pulsing red indicator imbedded within the display could indicate a bad read and reader out of range as shown in FIG. 8g. In another example, a rapid pulsing red embedded indicator could indicate a bad read and scanner out of range set of conditions as shown in FIG. 8h and a slow pulsing yellow light could indicate a low battery conditions as shown in FIG. 8i. Control circuit 40 can be configured to reinforce the above types of indicators by displaying text or graphical indicia on display 14d, as is indicated in the embodiments of FIGS. 8a–8i.

Referring to additional status indicating features which may be incorporated in the invention, one or more of the keys on the keyboard 13k be made translucent and in a light source disposed underneath the key or keys to indicate the presence of a particular condition such as good read. The good read translucent keys could include function keys, soft keys, or alphanumeric keys. For example, a translucent ENTER key 4 could have a light source placed underneath to indicate a good read or any other user specified condition as described in connection with FIGS. 4c–4f and as shown herein FIG. 9a. In another example, a translucent BACKSPACE (BACK) key 6 could have a light source placed underneath to indicate a bad read as shown in FIG. 9b. The light sources in these examples could be multicolored and pulsed to distinguish or identify the various conditions. A pulsed green light under the ENTER key 4, for example, could indicate a good read, a pulsed red light under the ENTER key 4 could indicate a bad read, and a pulsed yellow light placed under the ENTER key 4 could indicate a decoding in progress condition or another condition such as a battery low condition.

The length and duration of the pulses could be determined by the user and used to differentiate various conditions. For example, a single green pulse of user specified length could indicate a good read and a series of short yellow pulses could indicate a battery low condition. Specific details about the conditions could be shown on the display 14d automatically or by pressing the lighted translucent key.

Different color lights and pulsing schemes could be combined to simultaneously indicate multiple conditions. For example, control circuit 40 can be configured so that a pulsing green light underneath a translucent ENTER key 4 indicates a good read and battery low set of conditions as shown in FIG. 9c, a pulsing red light under a translucent FUNCTION (FNC) key 5 indicates a bad read and reader but of range set of conditions as shown in FIG. 9d and a rapid series of short blue pulses underneath a translucent BACKSPACE (BACK) key 6 indicates that a predetermined quantity and type of items has been scanned as shown in FIG. 9e.

Figure 9F:
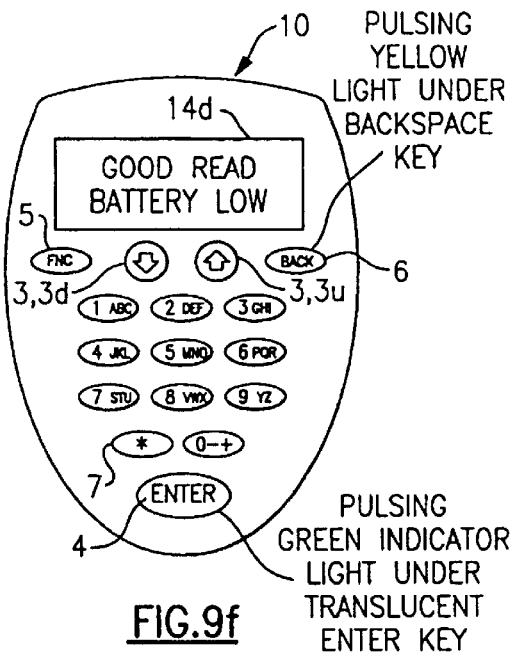

The reader 10 could also be configured so that one or more keys are simultaneously translucent with lights placed underneath. As discussed in other embodiments these light sources could be multicolored and pulsed to indicate various conditions. In one example, a translucent ENTER key 4 could pulse a green light to indicate a good read while a translucent BACKSPACE (BACK) key 6 could simultaneously pulse a yellow light to indicate a battery low condition as shown in FIG. 9f.

Figure 9G:
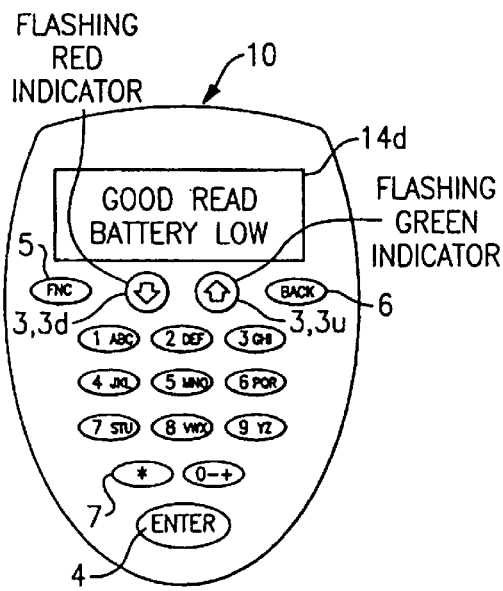
Figure 9H:
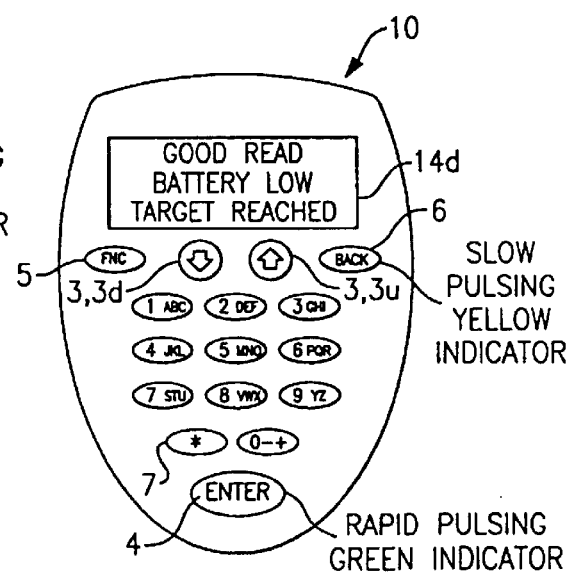

In still another example, the two soft keys 3 could be translucent with lights placed underneath to indicate different conditions. The up arrow key 3u could flash green for a good read while the down arrow key 3d could flash yellow for battery low as shown in FIG. 9g. It would also be possible to combine the above mentioned features to simultaneously indicate a plurality of different conditions. For example, a green rapid pulsing ENTER key 4 and a slow yellow pulsing BACKSPACE (BACK) key 6 could indicate a good read, battery low, type, and quantity of items scanned set of conditions. See FIG. 9h. The display 14d could indicate what the specific conditions are with text or graphics.

It would also be possible to configure the reader 10 so that one or more translucent keys are positioned on the side of the reader facing the user. The ENTER key 4 for example, could be positioned on the side of the reader facing the user. Status condition indicator 14SP can be configured to provide the function of enter key 4, or another key, so that panel indicator 14SL responds as a key of keyboard 13k when pressure is applied thereto. This arrangement would save space on the face of the reader while still allowing the user to easily view and access a translucent good read ENTER key 4.

In another embodiment of the invention the display 14d could be mounted on the side of the reader 10 proximate indicator 14DSL and 14DGL. This arrangement saves space on the face of the reader while still allowing the user to easily view the display 14d.

Figure 10A:
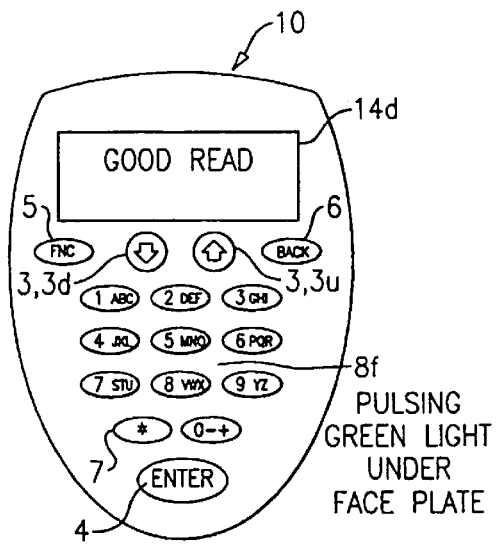
Figure 10B:
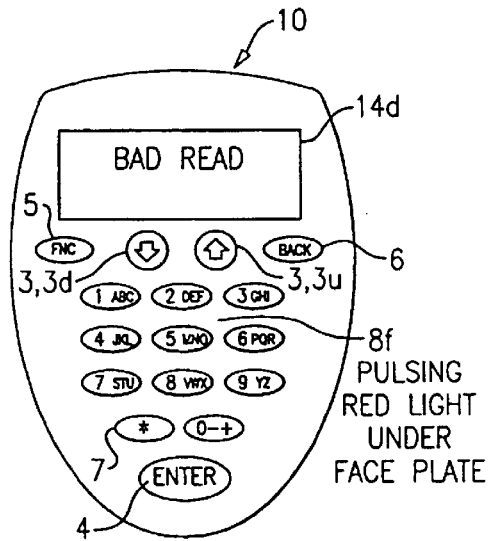
Figure 10C:
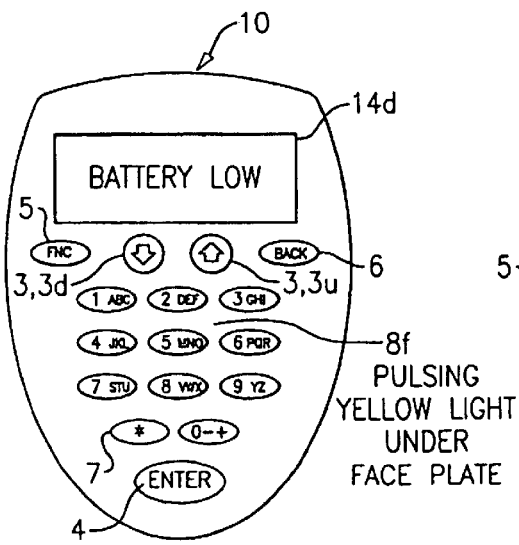
Figure 10D:
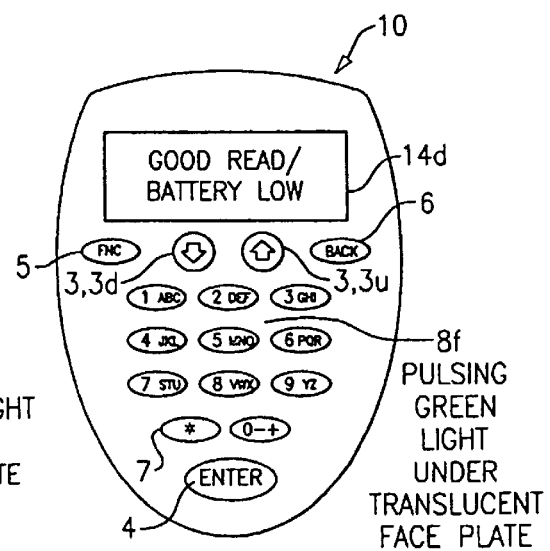

In another embodiment of the present invention, the reader head 8 can be configured so that the face plate 8f is entirely or partially translucent as described previously in connection with FIG. 4i. This allows the placement of an indicator light or lights 8SL within the housing 11 which saves space on the reader head and allows the light to be easily seen when a good read or any other condition is indicated. When a user specified condition causes the indicator light or lights 15 to go on plate 8F is illuminated. Such illumination which can be readily viewed by the user. As discussed in previous embodiments, the lights can be multicolored and pulsed to indicate a variety of different conditions. With reference to FIG. 4j, LED 8SL-1 may emit a different color than LED 8SL-2, which may emit a color different than LED 8SL-3. For example, a pulsing green light within the housing 11 could indicate a good read, a pulsing red light could indicate a bad read and a pulsing yellow light could indicate battery low as is indicated in FIGS. 10a, 10b, and 10c. Simultaneous conditions could be indicated by combining different color lights with pulsing. A pulsing green light, for example, could indicate a good read and low battery and a pulsing yellow light could indicate low battery and reader out of range as is indicated in FIGS. 10d and 10e. This embodiment could also include making the entire housing or any part thereof translucent while utilizing the same features described in the face plate embodiment.

In a variation of the translucent face plate 8f embodiment described hereinabove with reference to FIGS. 4i and 4j, it would be possible to have one or more indicator lights positioned strategically about the inside of the housing underneath the face plate 8f. These lights could independently or simultaneously indicate a number of different conditions by lighting up different sections of the face plate. For example, a pulsing green indicator light indicating a good read condition could light up the lower part of the translucent face plate 8f closest to the user while a pulsing yellow indicator light indicating a battery low condition could light up the translucent reader face plate 8f at the top of the reader face plate furthest from the user as shown in FIG. 10f. As discussed in previous embodiments, various color, and pulsing schemes can be utilized to indicate different conditions either independently or simultaneously. For example, a pulsing yellow light underneath the face plate 8f could indicate battery low and reader out of range as shown in FIG. 10g.

The present invention as described in the previous embodiments may also incorporate an audio signal producing device 14a. Control circuit 40 can control acoustic output to indicate various conditions such as good read or battery low. The audio signal could be used by itself or as a supplement to the previously described visual good read embodiments. The audio signal could be varied in tone and frequency to further distinguish different conditions. For example, a short high frequency tone could indicate a good read and a long series of low frequency tones could indicate a battery low condition.

In another embodiment of the present invention it would be possible to equip the reader 10 with an internally located vibration producing device 14L as shown in FIGS. 1a and 4a. In FIG. 1a the vibration device is shown as being provided by a vibrating battery 14va as are well known. In FIG. 4a, vibration device 14v is shown as being provided by a circuit board mounted vibration device 14vb mounted on circuit board 104. This device would relay a good read or any other desired condition through vibration when the particular condition was realized. The vibration would be detected by the user in a manner similar to the vibration detected by a ringing cell phone equipped with a vibration device when the cell phone signaled an incoming call.

A PC tool could be used in generating and loading custom fonts, operating programs and key definitions. Keyboard templates could be utilized to reflect key definitions. The reader 10 may incorporate a radio or use a cable to connect to another computer.

Although the preferred embodiments of the invention have been disclosed, it will be apparent to those having ordinary skill in the art that various modifications may be made without departing from the true concepts of the invention.

What is claimed is:

1. An optical reader comprising:

a housing having a head portion and a handle portion;

a trigger;

a keyboard integrated in said head portion;

a display disposed in said head portion;

a control circuit programmed so that when a key of said keyboard is held down scanning actuating functionality of said trigger is disabled;

at least one of a plurality of candidate characters are displayed on said display; and actuation of said trigger changes a highlight from a first of said candidate characters to a second of said candidate characters.

2. The optical reader of claim 1, wherein control circuit is further programmed so that release of said depressed key selects a highlighted one of said candidate characters.

3. The optical reader of claim 1, wherein said control circuit is further programmed so that depression of said trigger while said key is held down changes a highlight from a first of said candidate characters to a second of said candidate characters.

4. The optical reader of claim 1, wherein said control circuit is further programmed so that depression and release of said trigger changes a highlight from a first of said displayed characters to a second of said displayed characters.

5. The optical reader of claim 1, wherein said highlight comprises a blinking displayed character.

6. The optical reader of claim 1, wherein said highlight comprises a bold displayed character.

7. The optical reader of claim 1, wherein said highlight comprises a light on dark background displayed character.

8. The optical reader of claim 1, wherein said housing is a gun style housing.

9. An optical reader operating under the control of a control circuit said reader comprising:

a housing;

a keyboard having a plurality of alphanumeric keys and at least one function key;

a display;

and a trigger wherein said control circuit is configured so that in at least one mode of operation of said reader said trigger operates as a shift key.

10. An optical reader operating under the control of a control circuit said reader comprising:

a housing;

a keyboard having a plurality of alphanumeric keys and at least one function key;

a display; and a trigger wherein said control circuit is configured so that in at least one mode of operation of said reader said trigger operates as a backspace key.

11. An optical reader operating under the control of a control circuit said reader comprising:

a housing;

a keyboard having a plurality of alphanumeric keys and at least one function key;

a display;

and a trigger wherein said control circuit is configured so that in at least one mode of operation of said reader aid trigger provides an alpha cycling function in which said trigger is used to cycle through alpha characters assigned to said alphanumeric keys.

12. An optical reader for reading an indicia, said reader comprising:

a hand held housing;

an imaging assembly disposed in said housing;

a control circuit disposed in said housing configured to decode said indicia;

a keyboard disposed on said housing, said housing including at least one translucent key; and at least one light source disposed under said at least one translucent key, said at least one light source and said translucent keys defining a status condition indicator;

wherein said control circuit changes an indication indicated by said status condition indicator when said control circuit successfully decodes an indicia; and wherein said control circuit is configured so that when said translucent key is depressed while said translucent key indicates a status condition, a new display message is displayed by said display, said new display message pertaining to said status condition.

13. The reader of claim 12, wherein said translucent key is an ENTER key.

14. The reader of wherein said control circuit displays messages corresponding to an indicated status conditioning indicated by said key when said key is depressed.

15. The reader of claim 12, wherein said at least one light source comprises a single LED.

16. The reader of claim 12, wherein said least one light source comprises a green LED and a red LED, wherein said control circuit activates said green light when a decode attempt has been successful, and said red light when a decode attempt has been unsuccessful.

17. The reader of claim 12, wherein said translucent key is larger than remaining keys of said keyboard.

18. The reader of claim 12, wherein said reader further includes a display controlled by said control circuit, wherein said control circuit displays on said display messages corresponding to a status condition presently being indicated by said status condition indicator.

19. The reader of claim 12, wherein said translucent key is an ENTER key of said keyboard.

20. The reader of claim 12, wherein said hand held housing is a gun style housing.

21. A data collection device comprising:

a housing having a head portion and a handle portion;

a display disposed in said head portion;

a pair of soft keys disposed proximate said display, each of said pair of soft keys including an indicia thereon; and a control circuit disposed in said housing, said control circuit controlling indicia displayed on said display, said control circuit configured to display a pair of antonyms on said display wherein each of said pair of antonyms is disposed proximate one of said pair of soft keys thereby visually associating each of said pair of soft keys with one of said pair of antonyms.

22. The data collection device of claim 21 where said pair of antonyms include text.

23. The data collection device of claim 21 wherein said pair of antonyms include graphical symbols.

24. The data collection system of claim 21 wherein said indicia on one of said pair of soft keys is a "DOWN" arrow and said indicia on the other of said pair of soft keys is an "UP" arrow.

25. A data collection device comprising:

a housing;

a display disposed in said housing;

a first soft key disposed proximate to said display, said first soft key including a first indicia; and a second soft key disposed proximate to said display, said second soft key including a second indicia, said second indicia different from said first indicia; and a control circuit disposed in said housing controlling indicia displayed on said display, said control circuit operable in at least a first mode and a second mode wherein in said first mode said control circuit causes said display to display a third indicia proximate to said first soft key and a fourth indicia proximate to said second soft key, said third indicia being different than said fourth indicia; wherein in said second mode said control circuit causes said display to display a fifth indicia proximate to said first soft key and a sixth indicia proximate to said second soft key, said fifth indicia being different than said sixth indicia.

26. The data collection device of claim 25 wherein said first indicia includes an arrow having a first orientation, wherein said second indicia includes an arrow having a second orientation, and wherein said first orientation is different from said second orientation.

27. The data collection device of claim 25 wherein said third indicia and said fourth indicia each include text.

28. The data collection device of claim 25 wherein said fifth indicia and said sixth indicia each include text.

29. The data collection device of claim 25 wherein at least one of said third indicia and said fourth indicia includes a graphical image.

30. The data collection device of claim 25 wherein at least one of said fifth indicia and said sixth indicia includes a graphical image.

31. A data collection device comprising:

a housing;

a display disposed in said housing;

a first soft key disposed proximate to said display, said first soft key including a first indicia; and a second soft key disposed proximate to said display, said second soft key including a second indicia, said second indicia different from said first indicia; and a control circuit disposed in said housing controlling indicia displayed on said display, said control circuit operable in a plurality of modes, wherein in at least one of said plurality of modes said control circuit causes said display to display a third indicia proximate to said first soft key to said second soft key, wherein said third indicia is indicative of the status an operational feature of said data collection device, wherein activation of said first soft key and said second soft key result in the changes to the status of said operational feature and said control circuit causes said display to change the appearance of said third indicia in a manner reflective of the changed status of said operational feature.

32. A data collection device comprising:

a housing having a head portion and a handle portion;

a display disposed in said head portion;

a control circuit disposed in said housing controlling indicia displayed on said display; and a pair of arrow soft keys disposed adjacently relative to said display, wherein one of soft keys includes a "DOWN" arrow formed thereon in a permanent graphic and the other of the soft keys includes an "UP" arrow formed thereon in a permanent graphic; and wherein said control circuit in a first mode of operation displays the words "DECREASE" and "INCREASE," respectively, on said display adjacently relative to said down and up arrow soft keys.

33. The data collection device of claim 32 wherein said control circuit in a second mode of operation displays the words "NO" and "YES," respectively, on said display adjacently relative to said down and up arrow soft keys.

34. The data collection device of claim 32, wherein said control circuit in a second mode of operation displays the words "DOWN" and "UP," respectively, on said display adjacently relative to said down and up arrow soft keys.

35. The data collection device of claim 32, wherein said control circuit in a second mode of operation displays the words "DISAGREE" and "AGREE," respectively, on said display adjacently relative to said down and up arrow soft keys.

36. The data collection device of claim 32, wherein said control circuit in a second mode of operation displays the words "CANCEL" and "ACCEPT," respectively, on said display adjacently relative to said down and up arrow soft keys.

37. The data collection device of claim wherein said control circuit in a second mode of operation displays the words "REVERSE" and "FORWARD," respectively, on said display adjacently relative to said down and up arrow soft keys.

38. A data collection device comprising:

a gun style housing having a head portion and a handle portion;

a display disposed in said head portion;

a control circuit disposed in said housing controlling indicia displayed on said display; and and a pair of soft keys disposed adjacently relative to said display, wherein one of soft keys includes a "MINUS (−)" sign formed thereon in a permanent graphic and the other of the soft keys includes an "PLUS (+)" sign formed thereon in a permanent graphic;

wherein said control circuit in a first mode of operation displays on said display a first pair of messages adjacently relative to said arrow soft keys that are graphically reinforced by said combination of said down arrow and said up arrow soft keys, and wherein said control circuit in a second mode of operation displays on said display a second pair of messages adjacently relative to said arrow soft keys that are graphically reinforced by said combination of said down arrow and said up arrow soft key.

39. The data collection device of claim 38 wherein said control circuit in a third mode of operation displays on said display a third pair of messages adjacently relative to said arrow soft keys that are graphically reinforced by said combination of said down arrow and said up arrow soft key.

40. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein said control circuit is programmed to execute a mode of operation wherein said down and up arrow labeled soft keys reinforce the words "DOWN" and "UP" respectively shown on said display.

41. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein control circuit is programmed to execute a mode of operation wherein said down and up arrow labeled soft keys reinforce the words "NO" and "YES" respectively shown on said display.

42. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein said control circuit is programmed to execute a mode of operation wherein said down and up arrow labeled soft keys reinforce the words "DECREASE" and "INCREASE" respectively shown on said display.

43. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein said control circuit is programmed to execute a mode of operation wherein down and up arrow labeled soft keys reinforce the words "DISAGREE" and "AGREE" respectively shown on said display.

44. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein said control circuit is programmed to execute a mode of operation wherein down and up arrow labeled soft keys reinforce the words "CANCEL" and "ACCEPT" respectively shown on said display.

45. An optical reader operating under the control of a control circuit said reader comprising:

a housing;

a reader head;

a display; and a keyboard having a plurality of keys including two variable definition soft keys positioned adjacent said display and externally labeled with down and up arrow indicia;

wherein said control circuit is programmed to execute a mode of operation wherein down and up arrow labeled soft keys reinforce the words "REVERSE" and "FORWARD" respectively shown on said display.

* * * * *